(12) United States Patent
Koike et al.

(10) Patent No.: US 12,556,429 B2
(45) Date of Patent: Feb. 17, 2026

(54) COMMUNICATION SEMICONDUCTOR DEVICE CAPABLE OF SWITCHING BETWEEN REDUNDANT MODE AND NON-REDUNDANT MODE

(71) Applicant: Hitachi Astemo, Ltd., Hitachinaka (JP)

(72) Inventors: Takahiro Koike, Hitachinaka (JP); Takumi Masubuchi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 31 days.

(21) Appl. No.: 18/696,057

(22) PCT Filed: Oct. 7, 2021

(86) PCT No.: PCT/JP2021/037154
§ 371 (c)(1),
(2) Date: Mar. 27, 2024

(87) PCT Pub. No.: WO2023/058189
PCT Pub. Date: Apr. 13, 2023

(65) Prior Publication Data
US 2024/0396762 A1    Nov. 28, 2024

(51) Int. Cl.
*H04L 12/40* (2006.01)
*H04L 69/14* (2022.01)
(Continued)

(52) U.S. Cl.
CPC .. *H04L 12/40189* (2013.01); *H04L 12/40006* (2013.01); *H04L 69/14* (2013.01); *H04L 69/40* (2013.01); *H04W 24/08* (2013.01)

(58) Field of Classification Search
None
See application file for complete search history.

(56) References Cited

U.S. PATENT DOCUMENTS

| 5,903,544 | A | * | 5/1999 | Sakamoto | H04Q 11/0478 370/220 |
| 8,015,457 | B2 | * | 9/2011 | Koshikawa | G11C 29/02 714/710 |

(Continued)

FOREIGN PATENT DOCUMENTS

| JP | 2004-340877 A | 12/2004 |
| JP | 2015-050775 A | 3/2015 |

OTHER PUBLICATIONS

International Search Report and Written Opinion with English translations, for PCT/JP2021/037154, dated Jan. 11, 2022, 9 pages.

*Primary Examiner* — Jason D Cardone
(74) *Attorney, Agent, or Firm* — Foley & Lardner LLP

(57) ABSTRACT

A communication semiconductor device according to the present invention includes: a first communication circuit and a second communication circuit; a first switchover function unit that is connected to one end of the first communication circuit and one end of the second communication circuit, and that switches over paths for signals with respect to the first communication circuit and the second communication circuit; and a second switchover function unit that is connected to an other end of the first communication circuit and an other end of the second communication circuit, and that switches over paths for signals with respect to the first communication circuit and the second communication circuit, and outputs a switchover instruction, regarding an input destination and an output source, to the first switchover function unit and the second switchover function unit, on the basis of a redundant/non-redundant mode switchover signal, and a state of the first communication circuit and the second communication circuit.

11 Claims, 21 Drawing Sheets

(51) Int. Cl.
*H04L 69/40* (2022.01)
*H04W 24/08* (2009.01)

(56) References Cited

U.S. PATENT DOCUMENTS

| | | | | |
|---|---|---|---|---|
| 11,142,212 | B2* | 10/2021 | Terechko | B60W 60/00272 |
| 11,620,249 | B2* | 4/2023 | Beier | G06F 13/362 |
| | | | | 710/110 |
| 11,956,339 | B2* | 4/2024 | Haridas | H04L 12/40176 |
| 2002/0188713 | A1* | 12/2002 | Bloch | H04Q 3/5455 |
| | | | | 709/230 |
| 2004/0081460 | A1* | 4/2004 | Kakizaki | H04J 14/0227 |
| | | | | 398/33 |
| 2008/0320287 | A1* | 12/2008 | von Collani | G06F 11/1641 |
| | | | | 712/E9.035 |
| 2013/0088954 | A1* | 4/2013 | Sakamoto | H04W 24/08 |
| | | | | 370/228 |
| 2014/0375327 | A1* | 12/2014 | Sievers | G01R 19/0084 |
| | | | | 324/503 |
| 2017/0344445 | A1* | 11/2017 | Vanderah | G05B 19/00 |
| 2017/0359145 | A1* | 12/2017 | Downey | H04L 1/0009 |
| 2018/0172740 | A1* | 6/2018 | Marenski | G01R 15/14 |
| 2019/0235947 | A1* | 8/2019 | Ajima | H04L 1/00 |
| 2023/0403017 | A1* | 12/2023 | Zanchi | H03L 7/093 |
| 2024/0372547 | A1* | 11/2024 | Masubuchi | H02J 1/00 |

* cited by examiner

| | | SWITCH SETTING | | |
|---|---|---|---|---|
| | | No.1 | No.2 | No.3 |
| FIRST SWITCHOVER FUNCTION UNIT | SWITCH S1 | S1a | S1b | S1a |
| | SWITCH S2 | S2a | S2a | S2b |
| | SWITCH S3 | S3a | S3a | S2b |
| SECOND SWITCHOVER FUNCTION UNIT | SWITCH S4 | S4a | S4a | S4b |
| | SWITCH S5 | S5a | S5a | S5b |
| | SWITCH S6 | S6a | S6b | S6a |

FIG. 7

| ABNORMALITY NOTIFICATION (66) | MEANING |
|---|---|
| 2'b00 | NORMAL |
| 2'b01 | FAILURE OF FIRST COMMUNICATION CIRCUIT |
| 2'b10 | FAILURE OF SECOND COMMUNICATION CIRCUIT |
| 2'b11 | COMMUNICATION STOP (BOTH-SIDE COMMUNICATION IS STOPPED IN NON-REDUNDANT MODE) |

| No. | MUTUAL DIAGNOSTIC RESULT (616) | FIRST DIAGNOSTIC CIRCUIT RESULT (23) | SECOND DIAGNOSTIC CIRCUIT RESULT (33) | CONTROL IN SWITCHING FUNCTION CONTROL UNIT |
|---|---|---|---|---|
| 1 | OK | OK | OK | FIRST AND SECOND COMMUNICATION CIRCUITS AND FIRST AND SECOND DIAGNOSTIC CIRCUITS ARE ALL NORMAL<br>→ CONTINUE COMMUNICATION WITH FIRST COMMUNICATION CIRCUIT |
| 2 | NG | OK | NG | FAILURE OF SECOND COMMUNICATION CIRCUIT<br>→ CONTINUE COMMUNICATION WITH FIRST COMMUNICATION CIRCUIT (NON-REDUNDANT) (ABNORMALITY NOTIFICATION) |
| 3 | NG | NG | OK | FAILURE OF FIRST COMMUNICATION CIRCUIT<br>→ SWITCH TO SECOND COMMUNICATION CIRCUIT TO PERFORM COMMUNICATION (ABNORMALITY NOTIFICATION) |
| 4 | NG | OK | OK | FAILURE OF ANY ONE OF FIRST AND SECOND DIAGNOSTIC CIRCUITS AND MUTUAL DIAGNOSTIC CIRCUIT<br>→ STOP COMMUNICATION (ABNORMALITY NOTIFICATION) |
| 5 | OK | NG | OK | FAILURE OF EITHER FIRST DIAGNOSTIC CIRCUIT OR MUTUAL DIAGNOSTIC CIRCUIT<br>→ STOP COMMUNICATION (ABNORMALITY NOTIFICATION) |
| 6 | OK | OK | NG | FAILURE OF EITHER SECOND DIAGNOSTIC CIRCUIT OR MUTUAL DIAGNOSTIC CIRCUIT<br>→ STOP COMMUNICATION (ABNORMALITY NOTIFICATION) |
| 7 | OK | NG | NG | FAILURE OF EITHER FIRST AND SECOND DIAGNOSTIC CIRCUITS OR MUTUAL DIAGNOSTIC CIRCUIT<br>→ STOP COMMUNICATION (ABNORMALITY NOTIFICATION) |
| 8 | NG | NG | NG | FAILURE OF EITHER FIRST AND SECOND DIAGNOSTIC CIRCUITS OR MUTUAL DIAGNOSTIC CIRCUIT<br>→ STOP COMMUNICATION (ABNORMALITY NOTIFICATION) |

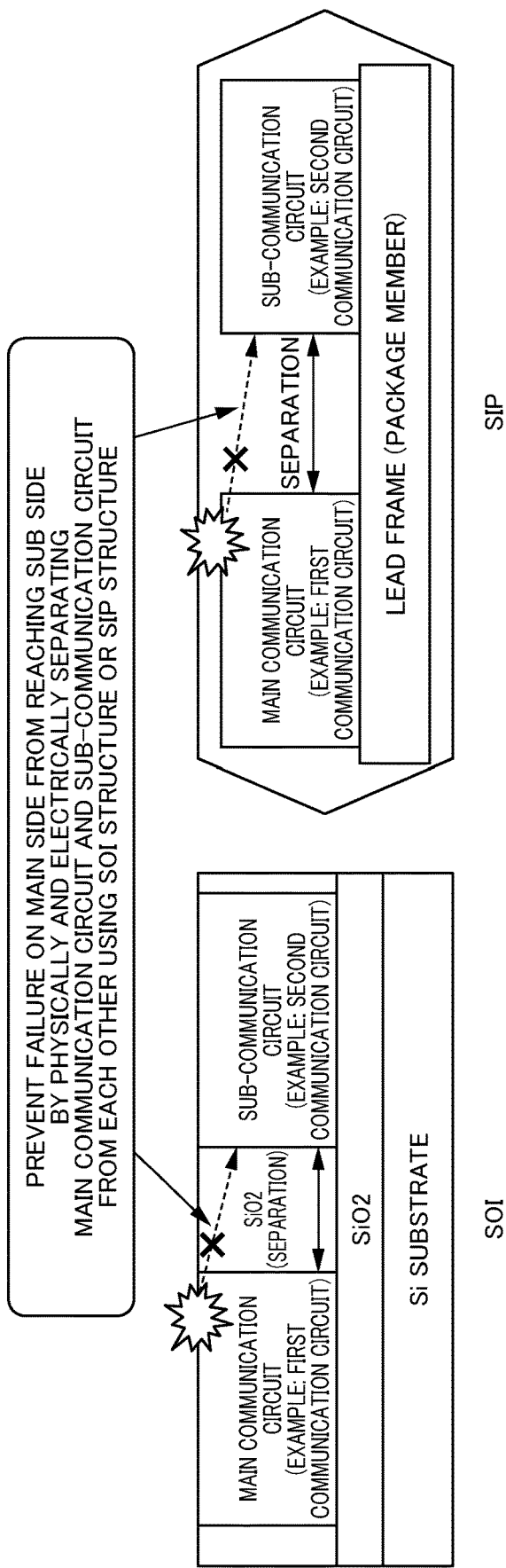

| No. | FIRST DIAGNOSTIC CIRCUIT RESULT (23) | SECOND DIAGNOSTIC CIRCUIT RESULT (33) | CONTROL IN SWITCHING FUNCTION CONTROL UNIT |
|---|---|---|---|
| 1 | OK | OK | BOTH FIRST AND SECOND COMMUNICATION CIRCUITS ARE NORMAL<br>→ CONTINUE COMMUNICATION INDEPENDENTLY WITH EACH COMMUNICATION CIRCUIT |
| 2 | OK | NG | FAILURE OF SECOND COMMUNICATION CIRCUIT<br>→ STOP COMMUNICATION USING SECOND COMMUNICATION CIRCUIT (ABNORMALITY NOTIFICATION)<br>→ CONTINUE COMMUNICATION WITH FIRST COMMUNICATION CIRCUIT |
| 3 | NG | OK | FAILURE OF FIRST COMMUNICATION CIRCUIT<br>→ SWITCH TO SECOND COMMUNICATION CIRCUIT TO CONTINUE COMMUNICATION<br>→ CUT OFF COMMUNICATION SYSTEM ORIGINALLY USED FOR COMMUNICATION USING SECOND COMMUNICATION CIRCUIT (ABNORMALITY NOTIFICATION) |

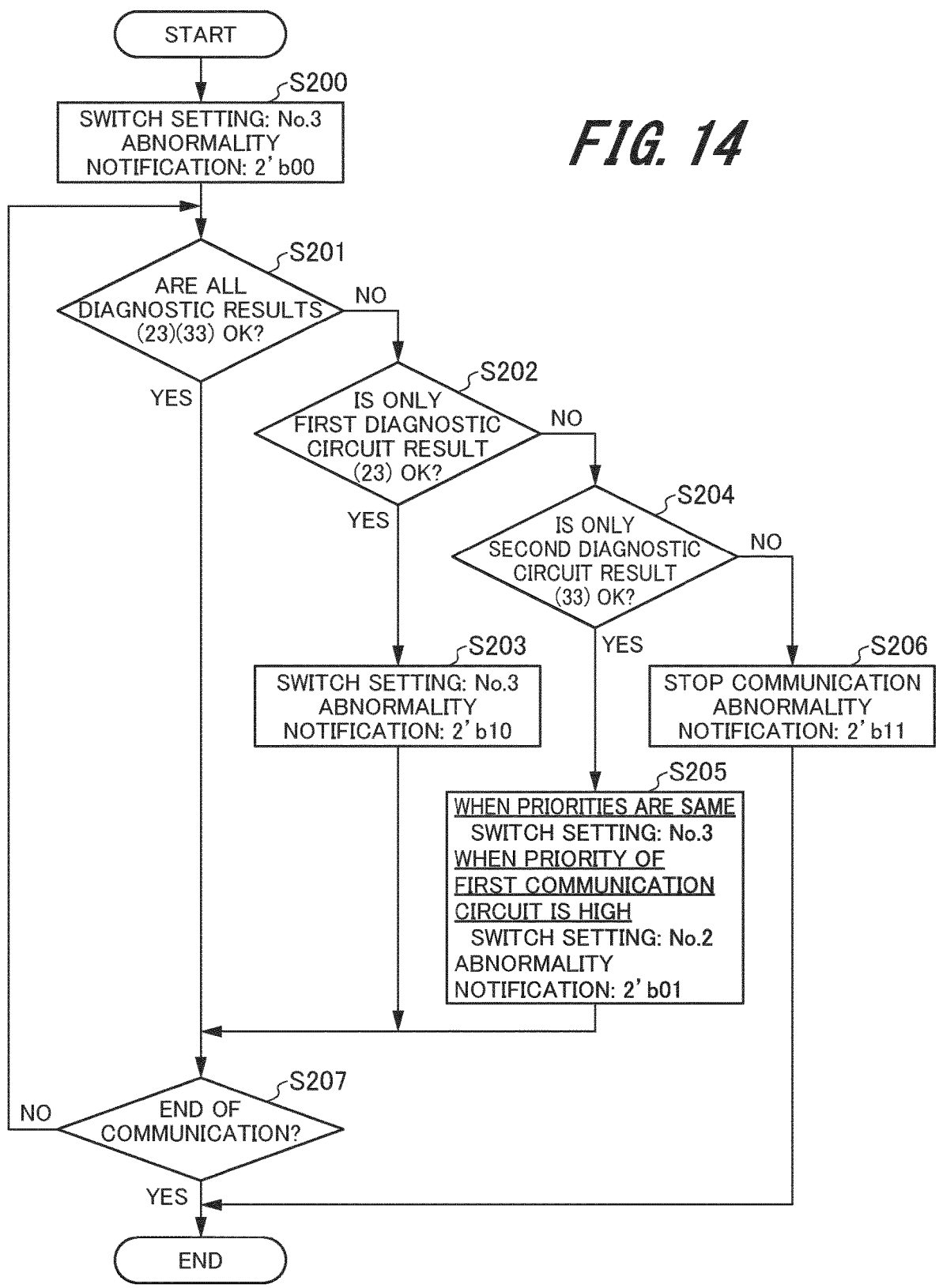

| | | SWITCH SETTING | |
|---|---|---|---|
| | | No.1 | No.2 |
| FIRST SWITCHOVER FUNCTION UNIT | SWITCH S1 | S1a | S1b |
| | SWITCH S2 | S2a | S2a |
| | SWITCH S3 | S3a | S3a |

FIG. 22

| COMMUNICATION CIRCUIT STATE | FIRST POWER CUTOFF REQUEST (67) | SECOND POWER CUTOFF REQUEST (68) |
|---|---|---|
| FIRST AND SECOND COMMUNICATION CIRCUITS ARE NORMAL | 1'b0 | 1'b0 |
| FIRST COMMUNICATION CIRCUIT FAILS | 1'b1 | 1'b0 |
| SECOND COMMUNICATION CIRCUIT FAILS | 1'b0 | 1'b1 |
| BOTH FIRST AND SECOND COMMUNICATION CIRCUITS FAIL | 1'b1 | 1'b1 |

COMMUNICATION SEMICONDUCTOR DEVICE CAPABLE OF SWITCHING BETWEEN REDUNDANT MODE AND NON-REDUNDANT MODE

TECHNICAL FIELD

The present invention relates to a communication semiconductor device capable of switching between a redundant mode and a non-redundant mode.

BACKGROUND ART

While the introduction of an integrated electronic control unit (ECU) in a vehicle architecture has been studied, there is a need for a communication semiconductor device, such as a controller area network I/F (CAN I/F), to have a redundant function from the viewpoint of functional safety.

For example, a technique described in Patent Literature 1 is known as a technique for realizing a redundant function of a semiconductor device. Patent Literature 1 describes providing a plurality of functional circuit units in a semiconductor device, causing each functional circuit unit to perform a self-diagnostic operation by a failure detection control circuit, determining the presence or absence of a failure by a failure determination circuit, and selecting an output of a functional circuit unit on a side where no failure occurs by an output signal switching circuit according to a determination result stored in a storage circuit. In the semiconductor device described in Patent Literature 1, the redundant function is realized by inputting the same signal to two or more functional circuit units.

CITATION LIST

Patent Literature

Patent Literature 1: JP 2004-340877 A

SUMMARY OF INVENTION

Technical Problem

However, in the configuration in which the same signal is input to two or more communication circuits, each communication circuit cannot be used for independent purposes. For this reason, there is a problem that a cost of a system that does not require a redundant function increases due to surplus hardware.

The present invention has been made in view of the above circumstances, and an object of the present invention is to propose a communication semiconductor device that has a redundant function and can configure a non-redundant system when the redundant function is not required.

Solution to Problem

In order to solve the above problems, a communication semiconductor device according to one aspect of the present invention includes: a first communication circuit that performs a predetermined operation on a signal input and performs a signal output; a second communication circuit that performs a predetermined operation on a signal input and performs a signal output; a first switchover function unit that is connected to one end of the first communication circuit and one end of the second communication circuit and switches an input destination and an output source of a signal with respect to the first communication circuit and the second communication circuit; a second switchover function unit that is connected to the other end of the first communication circuit and the other end of the second communication circuit and switches an input destination and an output source of the signal with respect to the first communication circuit and the second communication circuit; a diagnostic circuit that is provided in each of the first communication circuit and the second communication circuit and diagnoses the first communication circuit and the second communication circuit; and a control circuit connected to the first communication circuit and the second communication circuit and the first switchover function unit and the second switchover function unit. Then, the control circuit includes a switching function control unit that issues an input destination and output source switchover instruction to the first switchover function unit and the second switchover function unit based on a redundant/non-redundant mode switchover signal indicating an operation mode input from an outside and a diagnostic result of each diagnostic circuit.

Advantageous Effects of Invention

The communication semiconductor device according to at least one aspect of the present invention includes the first communication circuit and the second communication circuit and the first switchover function unit and the second switchover function unit for switching the signal path, and the first switchover function unit and the second switchover function unit are controlled based on the redundant/non-redundant mode switchover signal and the states of the first communication circuit and the second communication circuit. Therefore, at least one aspect of the present invention has a redundant function, and a non-redundant system can be configured when the redundant function is not required.

Problems, configurations, and effects other than those described above will be clarified by the following description of embodiments.

BRIEF DESCRIPTION OF DRAWINGS

FIG. 6 is a diagram illustrating a configuration example of a switching contents table in which switching contents of a first switchover function unit and a second switchover function unit according to the first embodiment of the present invention are described.

FIG. 7 is a diagram illustrating an example of abnormality notification by a control circuit.

FIG. 8 is a diagram illustrating an example of a diagnostic result of each diagnostic circuit and control in a switching function control unit in a redundant mode according to the first embodiment of the present invention.

FIG. 12 is a diagram illustrating an example of an IC configuration for avoiding simultaneous destruction of a first communication circuit and a second communication circuit as a configuration of a communication semiconductor device.

FIG. 13 is a diagram illustrating an example of a diagnostic result of each diagnostic circuit and control in a switching function control unit in a non-redundant mode according to a second embodiment of the present invention.

FIG. 14 is a flowchart illustrating an example of control processing of a first switchover function unit and a second switchover function unit by a switching function control unit of a control circuit in a non-redundant mode according to the second embodiment of the present invention.

FIG. 19 is a diagram illustrating a configuration example of a switching contents table in which switching contents of a first switchover function unit according to the third embodiment of the present invention are described.

FIG. 22 is a diagram illustrating an example of a cutoff request for a higher-level power supply circuit according to the fourth embodiment of the present invention.

DESCRIPTION OF EMBODIMENTS

Figure 1:
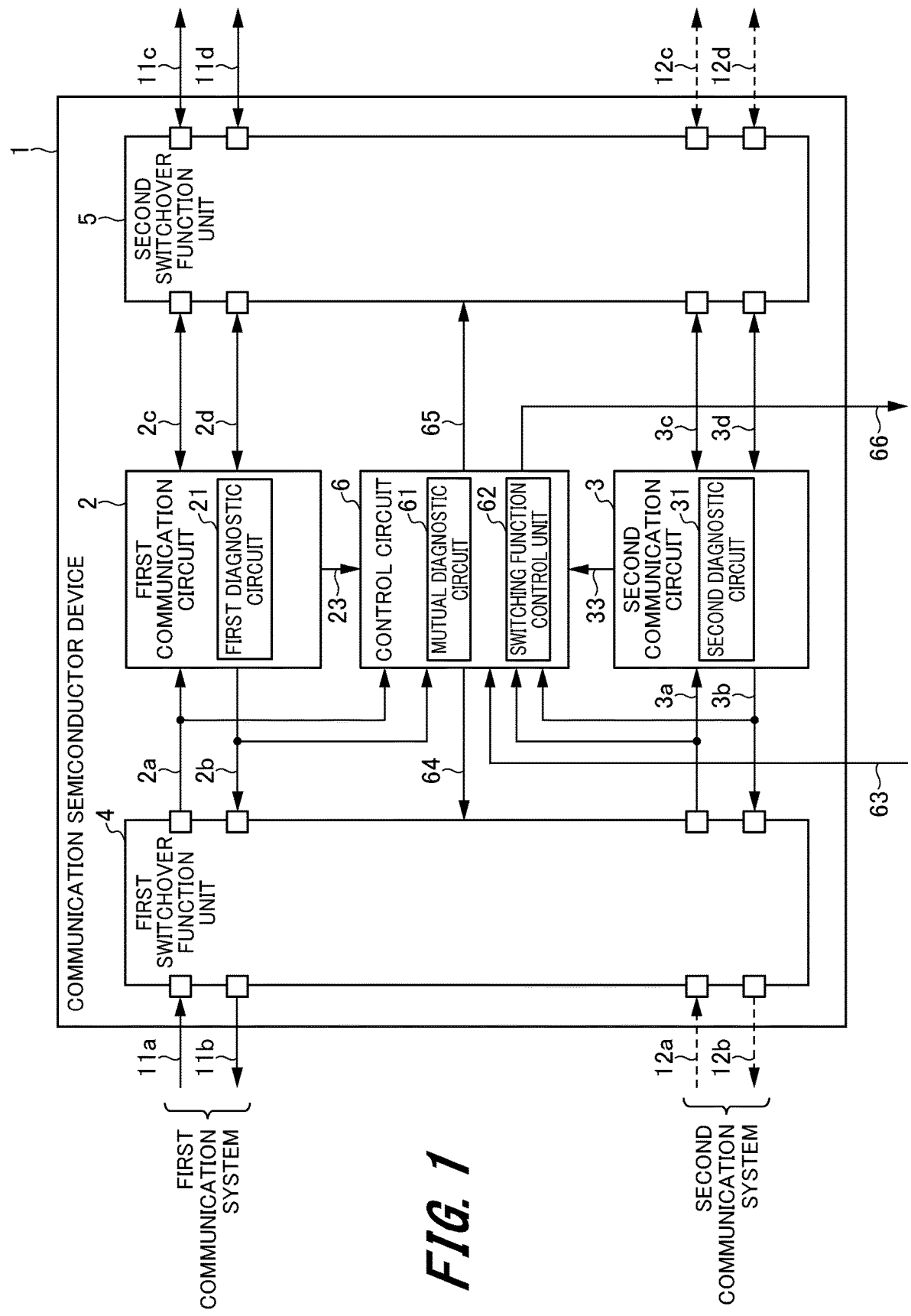
FIG. 1 is a block diagram illustrating a configuration example of a communication semiconductor device according to a first embodiment of the present invention.

Hereinafter, examples of modes for carrying out the present invention will be described with reference to the accompanying drawings. In the present specification and the accompanying drawings, components having substantially the same function or configuration are denoted by the same reference numerals, and repeated description thereof will be omitted. In order to make the description clearer, the drawings may be schematically represented as compared with actual aspects, but are merely examples, and do not limit the interpretation of the present invention.

First Embodiment

A configuration and operation of a communication semiconductor device according to a first embodiment of the present invention will be described.

First, an operation when performing communication using a main (main system, active system) communication circuit in one communication system and switching to a sub (subordinate system, standby system) communication circuit when an abnormality occurs in the main communication circuit in a case where the operation mode of the communication semiconductor device is set to the redundant mode will be described with reference to FIGS. 1 to 12.

[Configuration of Communication Semiconductor Device]

FIG. 1 is a block diagram illustrating a configuration example of the communication semiconductor device according to the first embodiment of the present invention.

An illustrated communication semiconductor device 1 includes a first communication circuit 2, a second communication circuit 3, a first switchover function unit 4, a second switchover function unit 5, and a control circuit 6. Communication signal lines 11a to 11d of the first communication system are connected between the communication semiconductor device 1 and a communication device (not illustrated) capable of communicating with the communication semiconductor device 1. Communication signal lines 12a to 12d, which are second communication systems, can also be connected between the communication semiconductor device 1 and the communication device. However, in the present embodiment, since there is only one communication system, the communication signal lines 12a to 12d are not considered. The communication signal lines 12a to 12d of the second communication system will be described in a second embodiment.

The communication semiconductor device 1 receives a redundant/non-redundant mode switchover signal 63 indicating an operation mode from an outside (For example, a microcomputer 7 illustrated in FIG. 17), performs predetermined communication processing, and outputs an abnormality notification 66 as necessary to notify an outside of the state of the communication semiconductor device 1. The microcomputer is an abbreviation of a microcomputer.

In the present embodiment, a redundant mode is designated in the redundant/non-redundant mode switchover signal 63. In the redundant mode, the signals input to the first communication circuit 2 and the second communication circuit 3 are the same signal.

[First Communication Circuit]

Figure 2:
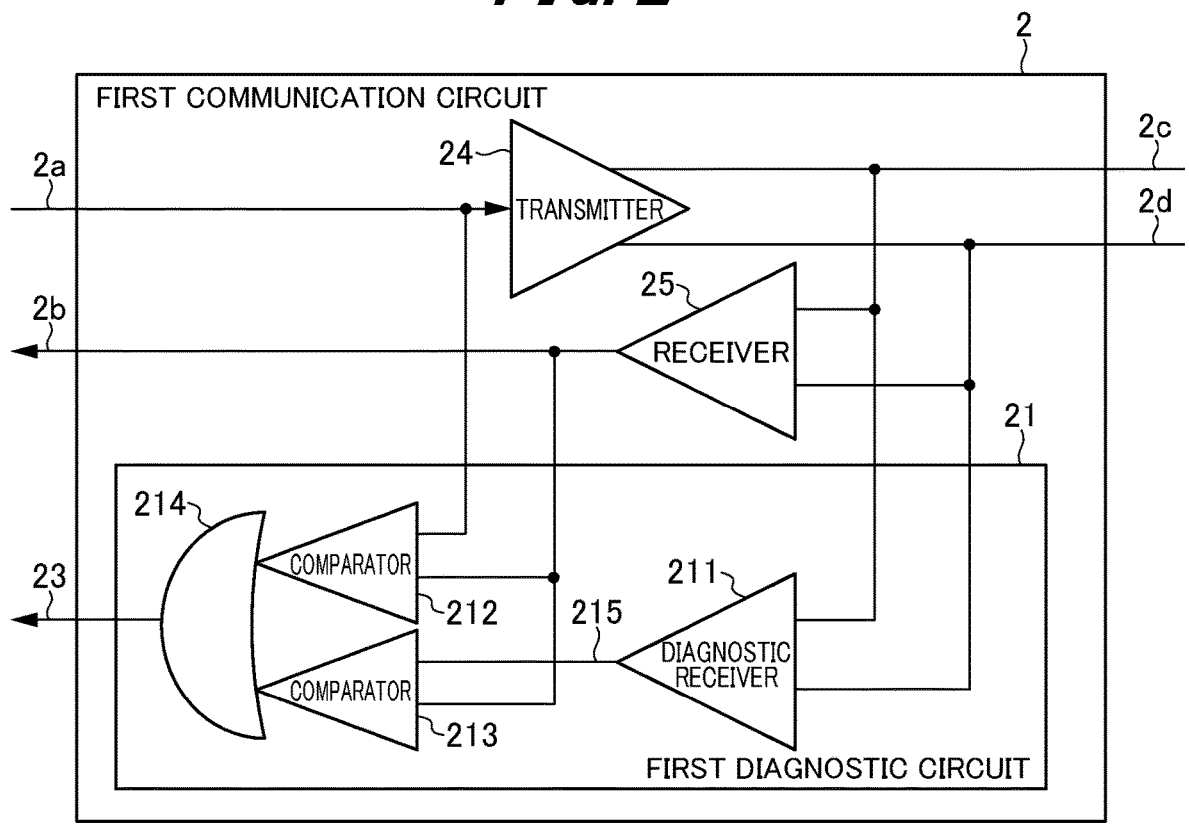
FIG. 2 is a circuit diagram illustrating a configuration example of a first communication circuit according to the first embodiment of the present invention.

FIG. 2 is a circuit diagram illustrating a configuration example of the first communication circuit 2.

The first communication circuit 2 receives and outputs communication signal lines 2a to 2d and a diagnostic result 23 of the first diagnostic circuit 21. For example, as illustrated in FIG. 2, the first communication circuit 2 according to the present embodiment includes a transmitter 24 as a transmission circuit, a receiver 25 as a reception circuit, and a first diagnostic circuit 21. The first diagnostic circuit 21 is a self-diagnostic circuit that diagnoses the first communication circuit 2.

The transmitter 24 uses a signal input from the communication signal line 2a connected between the transmitter 24 and the first switchover function unit 4 as a reception signal, and generates a positive-side transmission signal and a negative-side transmission signal from the reception signal. Then, for example, the transmitter 24 outputs a positive-side transmission signal through the communication signal line 2c and a negative-side transmission signal through the communication signal line 2d to the second switchover function unit 5. The positive-side transmission signal and the negative-side transmission signal output from the transmitter 24 are also input to the receiver 25 and the diagnostic receiver 211 of the first diagnostic circuit 21, respectively.

The receiver 25 uses the positive-side signal and the negative-side signal input from the communication signal lines 2c and 2d connected between the receiver 25 and the second switchover function unit 5 as reception signals, and generates a transmission signal from a difference between the two reception signals. For example, the receiver 25 outputs a high-level signal (H signal) when there is a potential difference in the reception signals of the communication signal lines 2c and 2d, and outputs a low-level signal (L signal) when there is no potential difference. Then, the receiver 25 outputs an H signal or an L signal as a transmission signal to the first switchover function unit 4 through the communication signal line 2b. The transmission signal output from the receiver 25 is also input to a comparator 212 and a comparator 213 of the first diagnostic circuit 21.

The first diagnostic circuit 21 includes a diagnostic receiver 211, the comparator 212, the comparator 123, and an OR circuit 214. The configuration and operation of the diagnostic receiver 211 are similar to those of the receiver 25. That is, the diagnostic receiver 211 uses the positive-side signal and the negative-side signal input from the communication signal lines 2c and 2d as reception signals, generates an output signal 215 from a difference between the two reception signals, and outputs the output signal 215 to the comparator 213. The comparator 212 compares the reception signal input from the communication signal line 2a to the transmitter 24 with a transmission signal output from the receiver 25 to the communication signal line 2b. The comparator 213 compares the transmission signal output from the receiver 25 to the communication signal line 2b with the output signal 215 of the diagnostic receiver 211.

The OR circuit 214 summarizes the comparison results of the comparator 212 and the comparator 213. The OR circuit 214 calculates the OR of the input values (comparison results) from the comparator 212 and the comparator 213, and outputs the calculation result to the switching function control unit 62 of the control circuit 6 as the diagnostic result 23 of the first diagnostic circuit 21. The comparison result of the comparator 212 is determined as OK when the two input values to the comparator 212 match (for example, if the difference is less than a predetermined value, an L signal is output), and is determined as NG when the two input values do not match (for example, when the difference is equal to or greater than the predetermined value, an H signal is output). The same applies to the comparator 213.

[Second Communication Circuit]

In addition, the configuration of the second communication circuit 3 is the same as the configuration of the first communication circuit 2. For example, the second communication circuit 3 includes a second diagnostic circuit 31 having the same configuration as the first diagnostic circuit 21, and receives and outputs communication signal lines 3a to 3d and a diagnostic result 33 of the second diagnostic circuit 31. The second diagnostic circuit 31 is a self-diagnostic circuit that diagnoses the second communication circuit 3.

As described above, each of the first communication circuit 2 and the second communication circuit 3 includes the transmitter 24 and the receiver 25. Each diagnostic circuit (the first diagnostic circuit 21, the second diagnostic circuit 31) of the first communication circuit 2 and the second communication circuit 3 diagnoses each of the first communication circuit 2 and the second communication circuit 3 by comparing information input to the transmitter 24 with information output from the receiver 25.

As described above, the first communication circuit 2 and the second communication circuit 3 have a self-diagnostic function (the first diagnostic circuit 21, the second diagnostic circuit 31). Therefore, when the main communication circuit fails, the communication circuit can be switched to the sub-communication circuit, and the failure of the sub-communication circuit can be detected before the switching.

[First Switchover Function Unit]

Figure 3:
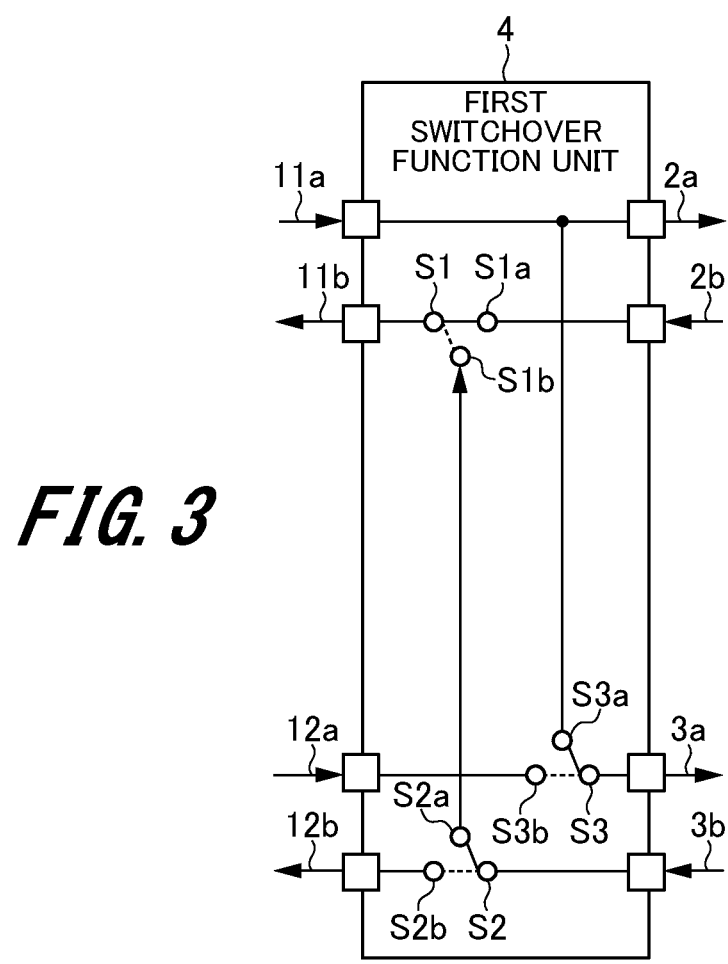
FIG. 3 is a circuit diagram illustrating a configuration example of a first switchover function unit according to the first embodiment of the present invention.

FIG. 3 is a circuit diagram illustrating a configuration example of the first switchover function unit 4.

The first switchover function unit 4 receives and outputs signals of the communication signal lines 11a and 11b of the first communication system, signals of the communication signal lines 2a and 2b connected to the first communication circuit 2, and signals of the communication signal lines 3a and 3b connected to the second communication circuit 3. For example, as illustrated in FIG. 3, the first switchover function unit 4 according to the present embodiment has a configuration including switches S1 to S3. The switch S1 switches a mover to a stator Sla (first communication system side) or a stator S1b (second communication system side) by a first switching function control signal 64 (FIG. 1) of the control circuit 6. The same applies to the switch S2 and the switch S3. That is, the switch S2 includes a mover, a stator S2a (first communication system side), and a stator S2b (second communication system side), and the switch S3 includes a mover, a stator S3a (first communication system side), and a stator S3b (second communication system side).

[Second Switchover Function Unit]

Figure 4:
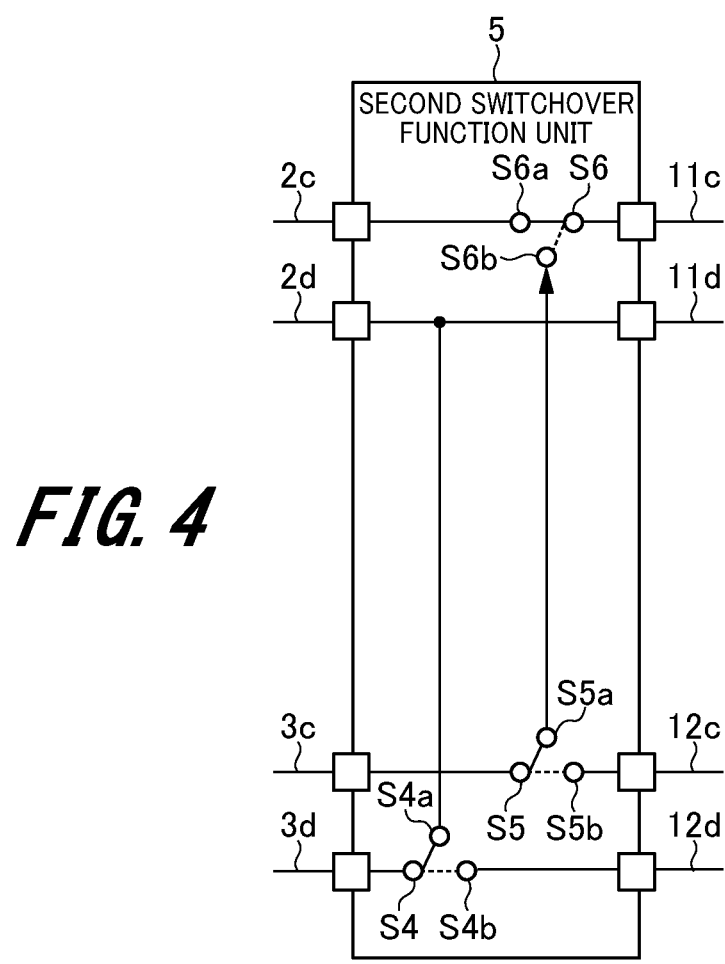
FIG. 4 is a circuit diagram illustrating a configuration example of a second switchover function unit according to the first embodiment of the present invention.

FIG. 4 is a circuit diagram illustrating a configuration example of the second switchover function unit 5.

The second switchover function unit 5 receives and outputs signals of the communication signal lines 11c and 11d of the first communication system, signals of the communication signal lines 2c and 2d connected to the first communication circuit 2, and signals of the communication signal lines 3c and 3d connected to the second communication circuit 3. For example, as illustrated in FIG. 4, the second switchover function unit 5 according to the present embodiment has a configuration including switches S4 to S6. The switch S6 switches a mover to a stator S6a (first communication system side) or a stator S6b (second communication system side) by a second switching function control signal 65 (FIG. 1) of the control circuit 6. The same applies to the switch S4 and the switch S5. That is, the switch S4 includes a mover, a stator S4a (first communication system side), and a stator S4b (second communication system side), and the switch S5 includes a mover, a stator S5a (first communication system side), and a stator S5b (second communication system side).

[Control Circuit]

The control circuit 6 receives the signals of the communication signal lines 2a and 2b of the first communication circuit 2, the signals of the communication signal lines 3a and 3b of the second communication circuit 3, the diagnostic result 23 of the first diagnostic circuit 21, the diagnostic result 33 of the second diagnostic circuit 31, and the redundant/non-redundant mode switchover signal 63. In addition, the control circuit 6 outputs the first switching function control signal 64 to the first switchover function unit 4, outputs the second switching function control signal 65 to the second switchover function unit 5, and outputs the abnormality notification 66 for notifying an outside (for example, the microcomputer 7 in FIG. 5) of the state of the communication semiconductor device 1.

Figure 5:
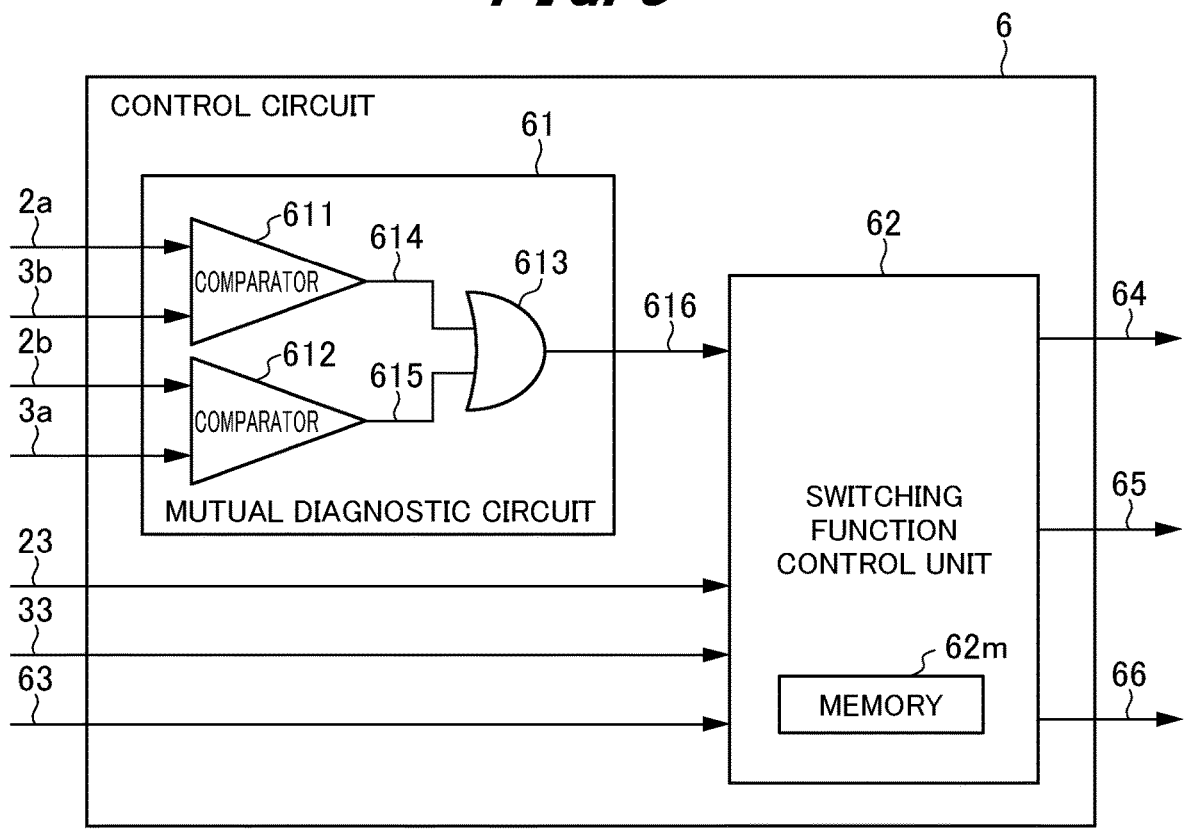
FIG. 5 is a circuit diagram illustrating a configuration example of a control circuit according to the first embodiment of the present invention.

As illustrated in FIG. 5 as an example, the control circuit 6 according to the present embodiment has a configuration including a mutual diagnostic circuit 61 and a switching function control unit 62, and performs the abnormality notification 66 as illustrated in FIG. 7 to be described later. For example, the switching function control unit 62 can be configured by combining a plurality of logic circuits including semiconductor elements. Similarly to the microcomputer 7, all or part of the configuration and functions of the control circuit 6 may be configured by a microcomputer.

FIG. 5 is a circuit diagram illustrating a configuration example of the control circuit 6.

The mutual diagnostic circuit 61 includes a comparator 611, a comparator 612, and an OR circuit 613.

The comparator 611 compares a signal input from the communication signal line 2a of the first communication circuit 2 with a signal input from the communication signal line 3b of the second communication circuit 3. In addition, the comparator 612 compares a signal input from the communication signal line 2b of the first communication circuit 2 with a signal input from the communication signal line 3a of the second communication circuit 3.

The OR circuit 613 summarizes the comparison results of the comparator 611 and the comparator 612. The OR circuit 613 calculates the OR of the input values (comparison results) from the comparator 611 and the comparator 612, and outputs the calculation result to the switching function control unit 62 as the diagnostic result 616 of the mutual diagnostic circuit 61. The comparison result of the comparator 611 is determined as OK when the two input values to the comparator 611 match (for example, if the difference is less than a predetermined value, an L signal is output), and is determined as NG when the two input values do not match (for example, when the difference is equal to or greater than the predetermined value, an H signal is output). The same applies to the comparator 612.

As described above, the control circuit 6 includes the mutual diagnostic circuit 61 configured to compare the first communication circuit 2 and the second communication circuit 3 with each other based on the input information and the output information of the first communication circuit 2 and the second communication circuit 3 and output the comparison result (diagnostic result 616) to the switching function control unit 62 when the operation mode (redundant/non-redundant mode switchover signal 63) is a redundant mode.

More specifically, the mutual diagnostic circuit 61 is configured to mutually diagnose the first communication circuit 2 and the second communication circuit 3 by comparing the information input to the transmitter 24 of the first communication circuit 2 with the information output from the receiver 25 of the second communication circuit 3 and comparing the information input to the transmitter 24 of the second communication circuit 3 with the information output from the receiver 25 of the first communication circuit 2.

The diagnostic result 23 of the first diagnostic circuit 21 provided in the first communication circuit 2, the diagnostic result 33 of the second diagnostic circuit 31 provided in the second communication circuit 3, the diagnostic result 616 of the mutual diagnostic circuit 61, and the redundant/non-redundant mode switchover signal 63 are input to the switching function control unit 62. The switching function control unit 62 issues an input destination and output source switchover instruction to the first switchover function unit 4 and the second switchover function unit 5 based on the redundant/non-redundant mode switchover signal 63 and the diagnostic results 23, 33, and 616 of the diagnostic circuits. As illustrated in FIG. 5, the switching function control unit 62 outputs the first switching function control signal 64 as an input destination and output source switchover instruction to the first switchover function unit 4, and outputs the second switching function control signal 65 as an input destination and output source switchover instruction to the second switchover function unit 5.

As described above, the switching function control unit 62 switches the input path and the output path of the signal in the first switchover function unit 4 and the second switchover function unit 5 based on the diagnostic result 161 of the mutual diagnostic circuit 61 and the diagnostic results 23 and 33 of the diagnostic circuits included in the first communication circuit 2 and the second communication circuit 3.

In addition, the switching function control unit 62 outputs the abnormality notification 66 indicating the state of the communication semiconductor device 1, that is, the states of the first communication circuit 2, the second communication circuit 3, and the respective diagnostic circuits based on the diagnostic results 23, 33, and 616 of the respective diagnostic circuits.

In addition, the switching function control unit 62 includes a memory 62m that stores priorities of the first communication circuit 2 and the second communication circuit 3. The priority will be described in a second embodiment. For example, as illustrated in FIG. 6, the switches S1 to S6 of the first switchover function unit 4 and the second switchover function unit 5 are controlled according to the diagnostic results 23, 33, and 616 of the diagnostic circuits. Details will be described with reference to a flowchart illustrated in FIG. 9 to be described later. Note that, for the switch setting or the abnormality notification 66 illustrated in FIG. 9, FIGS. 6 and 7 will be referred to.

FIG. 6 is a diagram illustrating a configuration example of a switching contents table T1 in which switching contents of the first switchover function unit 4 and the second switchover function unit 5 are written.

The switching contents table T1 has items of "type of switchover function unit", "type of switch", and "switch setting (connection switching)".

When the switch setting of the first switching function control signal 64 is "No. 1", in the first switchover function unit 4, the switch S1 is switched to the stator S1a, the switch S2 is switched to the stator S2a, and the switch S3 is switched to the stator S3a. In addition, when the switch setting of the first switching function control signal 64 is "No. 2", in the first switchover function unit 4, the switch S1 is switched to the stator S1b, the switch S2 is switched to the stator S2a, and the switch S3 is switched to the stator S3a. In addition, when the switch setting of the first switching function control signal 64 is "No. 3", in the first switchover function unit 4, the switch S1 is switched to the stator S1a, the switch S2 is switched to the stator S2b, and the switch S3 is switched to the stator S3b.

When the switch setting of the second switching function control signal 65 is "No. 1", in the second switchover function unit 5, the switch S4 is switched to the stator S4a, the switch S5 is switched to the stator S5a, and the switch S6 is switched to the stator S6a. In addition, when the switch setting of the second switching function control signal 65 is "No. 2", in the second switchover function unit 5, the switch S4 is switched to the stator S4a, the switch S5 is switched to the stator S5a, and the switch S6 is switched to the stator S6b. In addition, when the switch setting of the second switching function control signal 65 is "No. 3", in the second switchover function unit 5, the switch S4 is switched to the stator S4b, the switch S5 is switched to the stator S5b, and the switch S6 is switched to the stator S6a.

FIG. 7 is a diagram illustrating an example of the abnormality notification 66 by the control circuit 6.

The switching function control unit 62 of the control circuit 6 outputs any one of 2'b00, 2'b01, 2'b10, and 2'b11 as the abnormality notification 66 according to the state of the communication semiconductor device 1. In the present embodiment, the abnormality notification 66 is a 2-bit signal, and the meaning of each abnormality notification is as follows. In this specification, a failure refers to a state in which the communication circuit cannot normally operate.

2'b00: normal
2'b01: failure of the first communication circuit 2
2'b10: failure of the second communication circuit 3
2'b11: communication stop (in non-redundant mode, communication in both communication circuits is stopped)

[Diagnostic Result of Each Diagnostic Circuit and Control in Switching Function Control Unit]

FIG. 8 is a diagram illustrating an example of a diagnostic result of each diagnostic circuit and control in the switching function control unit 62 in the redundant mode.

An illustrated table 71 has items of "No.", "diagnostic result of mutual diagnostic circuit", "diagnostic result of first diagnostic circuit", "diagnostic result of second diagnostic circuit", and "control in switching function control unit".

"No." is a number indicating the position of a record in the table 71.

"Diagnostic result of mutual diagnostic circuit" indicates the diagnostic result 616 of the mutual diagnostic circuit 61 as OK (good) or NG (bad).

"Diagnostic result of first diagnostic circuit" indicates the diagnostic result 23 of the first diagnostic circuit 21 as OK (good) or NG (bad).

"Diagnostic result of second diagnostic circuit" indicates the diagnostic result 33 of the second diagnostic circuit 31 as OK (good) or NG (bad).

"Control in the switching function control unit" indicates the state of the communication semiconductor device 1 and contents of control in the switching function control unit 62. In FIG. 8, the contents of the control in the switching function control unit 62 are based on the premise that communication is performed with the first communication circuit 2 as a main communication circuit in the redundant mode.

As shown in record No. 1, when the diagnostic result 616 of the mutual diagnostic circuit 61 is "OK", the diagnostic result 23 of the first diagnostic circuit 21 is "OK", and the diagnostic result 33 of the second diagnostic circuit 31 is "OK", it can be determined that the first communication circuit 2 and the second communication circuit 3 and the first diagnostic circuit 21 and the second diagnostic circuit 31 are all normal. Therefore, the switching function control unit 62 controls the first switchover function unit 4 and the second switchover function unit 5 so that the communication using the first communication circuit 2 is continued.

As shown in record No. 2, when the diagnostic result 616 of the mutual diagnostic circuit 61 is "NG", the diagnostic result 23 of the first diagnostic circuit 21 is "OK", and the diagnostic result 33 of the second diagnostic circuit 31 is "NG", it can be determined that the second communication circuit 3 has failed. Therefore, the switching function control unit 62 controls the first switchover function unit 4 and the second switchover function unit 5 so that the communication using the first communication circuit 2 is continued. In addition, the switching function control unit 62 outputs the abnormality notification 66 (2'b10) including failure information of the second communication circuit 3. In addition, since the second communication circuit 3 has failed, switching from the first communication circuit 2 to the second communication circuit 3 cannot be performed. For this reason, in the present embodiment, it is assumed that the redundant mode is set. However, the communication semiconductor device 1 has a substantially non-redundant configuration.

As shown in record No. 3, when the diagnostic result 616 of the mutual diagnostic circuit 61 is "NG", the diagnostic result 23 of the first diagnostic circuit 21 is "NG", and the diagnostic result 33 of the second diagnostic circuit 31 is "OK", it can be determined that the first communication circuit 2 has failed. Therefore, the switching function control unit 62 controls the first switchover function unit 4 and the second switchover function unit 5 so that communication is performed by switching from the first communication circuit 2 to the second communication circuit 3. In addition, the switching function control unit 62 outputs the abnormality notification 66 (2'b01) indicating that the first communication circuit 2 has failed.

As shown in record No. 4, when the diagnostic result 616 of the mutual diagnostic circuit 61 is "NG", the diagnostic result 23 of the first diagnostic circuit 21 is "OK", and the diagnostic result 33 of the second diagnostic circuit 31 is "OK", it is considered that any one of the first diagnostic circuit 21, the second diagnostic circuit 31, and the mutual diagnostic circuit 61 has failed. In this case, the switching function control unit 62 outputs the abnormality notification 66 (2'b11) indicating communication stop. Then, a higher-level computer (for example, the microcomputer 7 in FIG. 17) that has received the abnormality notification 66 gives an instruction to stop the communication.

As shown in record No. 5, when the diagnostic result 616 of the mutual diagnostic circuit 61 is "OK", the diagnostic result 23 of the first diagnostic circuit 21 is "NG", and the diagnostic result 33 of the second diagnostic circuit 31 is "OK", it is considered that either the first diagnostic circuit 21 or the mutual diagnostic circuit 61 has failed. In this case, the switching function control unit 62 outputs the abnormality notification 66 (2'b11) indicating communication stop, and the communication is stopped.

As shown in record No. 6, when the diagnostic result 616 of the mutual diagnostic circuit 61 is "OK", the diagnostic result 23 of the first diagnostic circuit 21 is "OK", and the diagnostic result 33 of the second diagnostic circuit 31 is "NG", it is considered that either the second diagnostic circuit 31 or the mutual diagnostic circuit 61 has failed. In this case, the switching function control unit 62 outputs the abnormality notification 66 (2'b11) indicating communication stop, and the communication is stopped.

As shown in record No. 7, when the diagnostic result 616 of the mutual diagnostic circuit 61 is "OK", the diagnostic result 23 of the first diagnostic circuit 21 is "NG", and the diagnostic result 33 of the second diagnostic circuit 31 is "NG", it can be determined that both the first diagnostic circuit 21 and the second diagnostic circuit 31 or the mutual diagnostic circuit 61 has failed. In this case, the switching function control unit 62 outputs the abnormality notification 66 (2'b11) indicating communication stop, and the communication is stopped.

As shown in record No. 8, when the diagnostic result 616 of the mutual diagnostic circuit 61 is "NG", the diagnostic result 23 of the first diagnostic circuit 21 is "NG", and the diagnostic result 33 of the second diagnostic circuit 31 is "NG", it can be determined that both the first diagnostic circuit 21 and the second diagnostic circuit 31 or the mutual diagnostic circuit 61 has failed. In this case, the switching function control unit 62 outputs the abnormality notification 66 (2'b11) indicating communication stop, and the communication is stopped.

As described above, the switching function control unit 62 of the control circuit 6 can detect the failure of the first diagnostic circuit 21, the second diagnostic circuit 31, and the mutual diagnostic circuit 61 based on the diagnostic result 23 of the first diagnostic circuit 21, the diagnostic result 33 of the second diagnostic circuit 31, and the diagnostic result 616 of the mutual diagnostic circuit 61. In addition, by referring to the self-diagnostic result (diagnostic results 23 and 33) and the mutual diagnostic result (diagnostic result 616), the diagnostic accuracy can be improved. In addition, since the mutual diagnostic circuit 61 improves diagnostic accuracy, the mutual diagnostic circuit 61 is not an essential configuration. The presence or absence of the mutual diagnostic circuit 61 may be determined according to the degree of diagnostic accuracy required.

Figure 17:
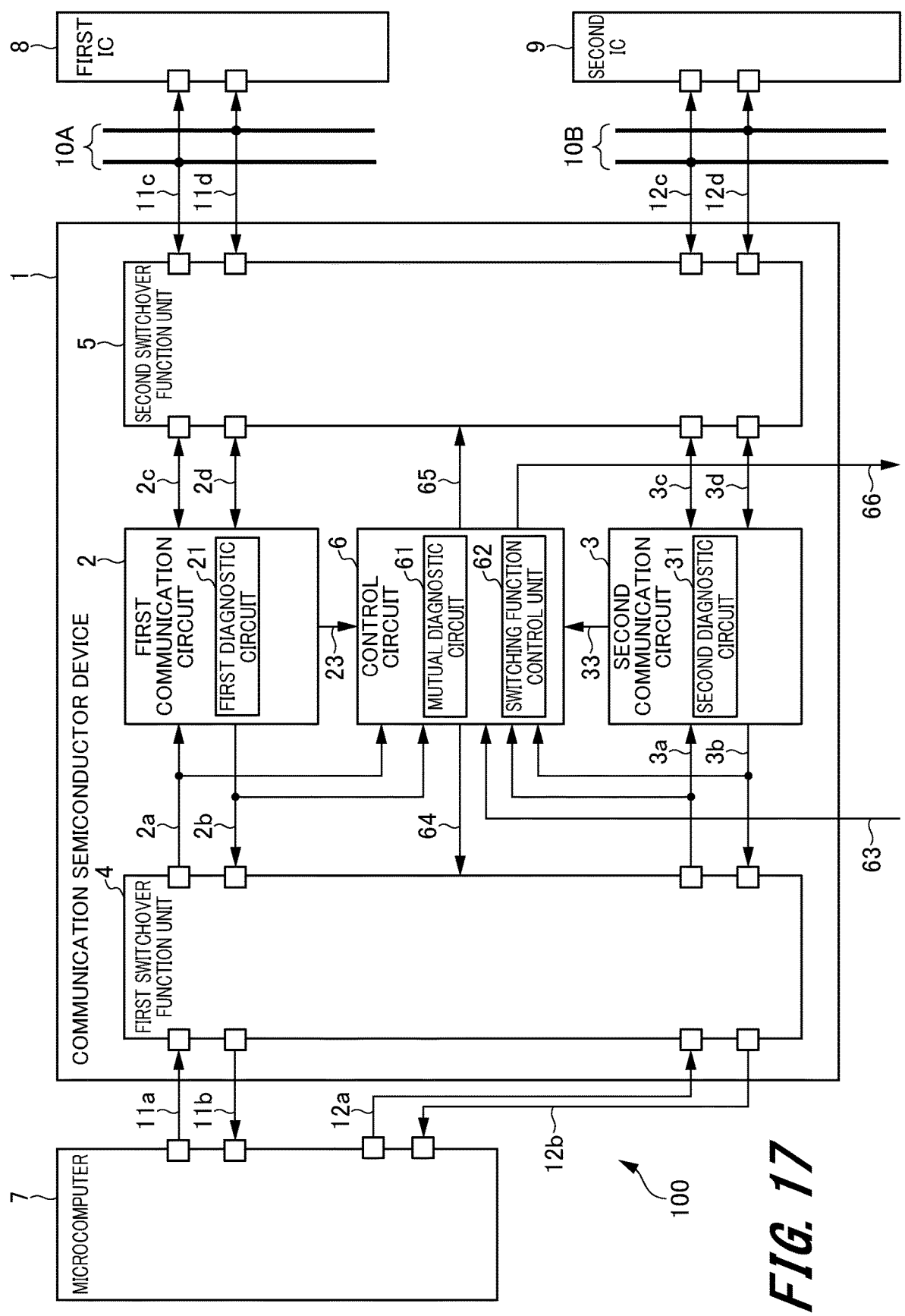
FIG. 17 is a diagram illustrating an example of a case where a first IC and a second IC are connected to different CAN buses in a system using a communication semiconductor device according to a third embodiment of the present invention as a CAN I/F.

In addition, the switching function control unit 62 is configured to notify the communication partner (for example, the microcomputer 7, the first IC 8, the second IC 9, and the like in FIG. 17) of the communication semiconductor device 1 of the abnormality when the abnormality of any one of the first communication circuit 2 and the second communication circuit 3, the diagnostic circuits 21 and 31 of the first communication circuit 2 and the second communication circuit 3, and the mutual diagnostic circuit 61 is detected.

Therefore, the communication partner, which is the communication source and/or the communication destination of the communication semiconductor device 1, can check whether or not the communication is normal based on the presence or absence of the abnormality notification 66.

[Control Processing of Switching Function Control Unit]

Next, a procedure of control processing of the first switchover function unit 4 and the second switchover function unit 5 by the switching function control unit 62 of the control circuit 6 in the redundant mode will be described with reference to FIG. 9.

Figure 9:
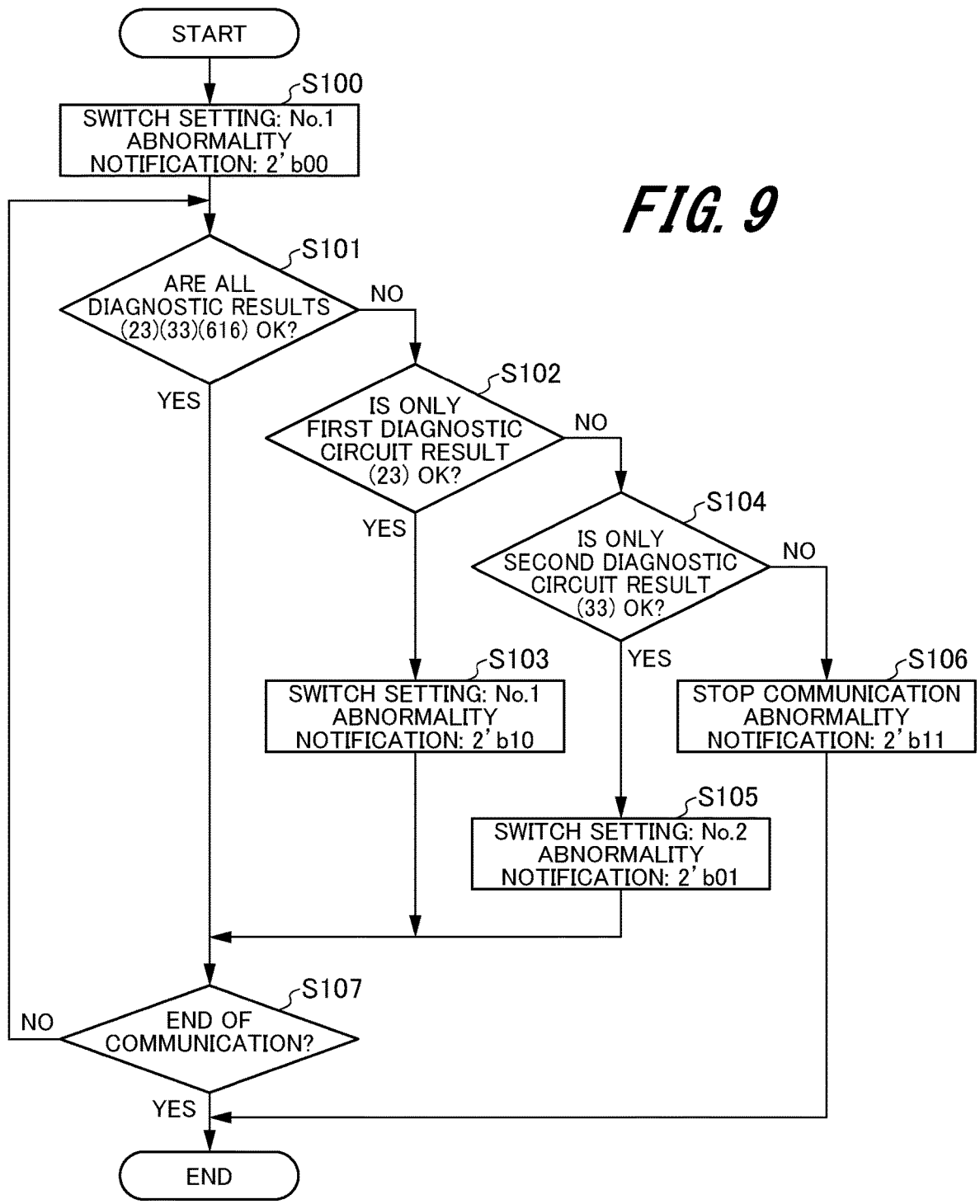
FIG. 9 is a flowchart illustrating an example of control processing of a first switchover function unit and a second switchover function unit by a switching function control unit of a control circuit in a redundant mode according to the first embodiment of the present invention.

FIG. 9 is a flowchart illustrating an example of control processing of the first switchover function unit 4 and the second switchover function unit 5 by the switching function control unit 62 of the control circuit 6 in the redundant mode. Here, it is assumed that the first communication circuit 2 is a main communication circuit and the second communication circuit is a sub-communication circuit. Note that, for the contents of the switch setting or the abnormality notification illustrated in FIG. 9, FIGS. 6 and 7 will be referred to.

At the start of communication, the switching function control unit 62 performs switching control of the first switchover function unit 4 and the second switchover function unit 5 as in the switch setting "No. 1" illustrated in FIG. 6, thereby performing communication using the first communication circuit 2 that is a main communication circuit. Here, the switching function control unit 62 outputs "2'b00" as the abnormality notification 66 (S100). At this stage, the switching function control unit 62 determines that there is no abnormality in the first communication circuit 2 and the second communication circuit 3, the first diagnostic circuit 21 and the second diagnostic circuit 31, and the mutual diagnostic circuit 61.

Figure 10:
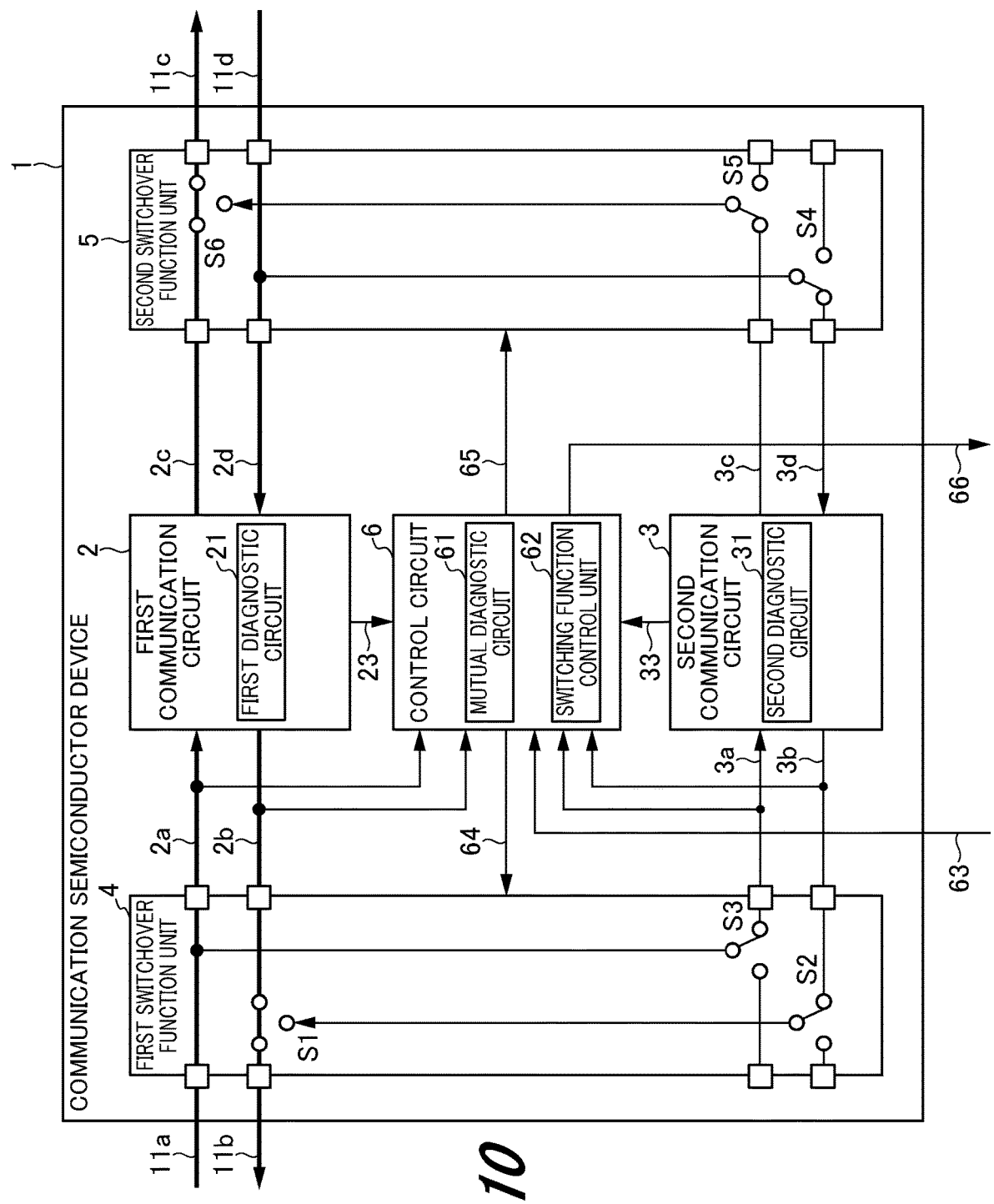
FIG. 10 is a diagram illustrating a communication path when the first communication circuit is used in the redundant mode according to the first embodiment of the present invention.

Here, FIG. 10 illustrates a communication path when the first communication circuit 2 (main communication circuit) is used in the redundant mode.

Since the switch setting is "No. 1", the first switchover function unit 4 inputs and outputs the signals of the communication signal lines 11a and 11b of the first communication system to and from the first communication circuit 2 as indicated by thick lines in FIG. 10. Similarly, the second switchover function unit 5 inputs and outputs the signals of the communication signal lines 11c and 11d of the first communication system to and from the first communication circuit 2.

FIG. 9 is referred to again for explanation. Then, the switching function control unit 62 determines whether or not the diagnostic result 616 of the mutual diagnostic circuit 61, the diagnostic result 23 of the first diagnostic circuit 21, and the diagnostic result 33 of the second diagnostic circuit 31 are all OK (S101). When all the diagnostic results 23, 33, and 616 of the diagnostic circuits are OK (YES in S101), it can be determined that the first communication circuit 2 and the second communication circuit 3 are normally operating.

Then, the switching function control unit 62 determines whether or not the communication has ended with the switch setting being "No. 1" and the abnormality notification 66 being "2'b00" (S107). Then, when the communication has not ended (NO in S107), the switching function control unit 62 returns to the determination processing in step S101 to check the diagnostic result of each diagnostic circuit. When the communication has ended (YES in S107), the switching function control unit 62 ends the processing of this flowchart.

On the other hand, when any one of the diagnostic results 23, 33, and 616 of the diagnostic circuits is NG (NO in S101), the switching function control unit 62 proceeds to step S102. Then, the switching function control unit 62 determines whether or not only the diagnostic result 23 of the first diagnostic circuit 21 is OK (S102).

When only the diagnostic result 23 of the first diagnostic circuit 21 is OK (YES in S102), it can be seen that the first diagnostic circuit 21 and the second diagnostic circuit 31 are normally operating. Then, since only the diagnostic result 23 of the first diagnostic circuit 21 is OK, it can be determined that the second communication circuit 3 has failed. Therefore, the switching function control unit 62 outputs "2'b10" as the abnormality notification 66 (S103) while maintaining the switch setting at "No. 1", and then proceeds to step S107. Then, in step S107, the switching function control unit 62 determines whether or not the communication has ended with the switch setting being "No. 1" and the abnormality notification 66 being "2'b10".

On the other hand, when only the diagnostic result 23 of the first diagnostic circuit 21 is not OK (NO in S102), the switching function control unit 62 proceeds to step S104. Then, the switching function control unit 62 determines whether or not only the diagnostic result 33 of the second diagnostic circuit 31 is OK (S104).

When only the diagnostic result 33 of the second diagnostic circuit 31 is OK (YES in S104), it can be seen that the first diagnostic circuit 21 and the second diagnostic circuit 31 are normally operating. Then, since only the diagnostic result 33 of the second diagnostic circuit 31 is OK, it can be determined that the first communication circuit 2 has failed.

At that time, in order not to stop the communication, the switching function control unit 62 performs switching control as in the switch setting "No. 2" illustrated in FIG. 6 to continue the communication using the second communication circuit 3 that is a sub-communication circuit. In addition, the switching function control unit 62 outputs "2'b01" as the abnormality notification 66 (S105), and then proceeds to step S107.

Figure 11:
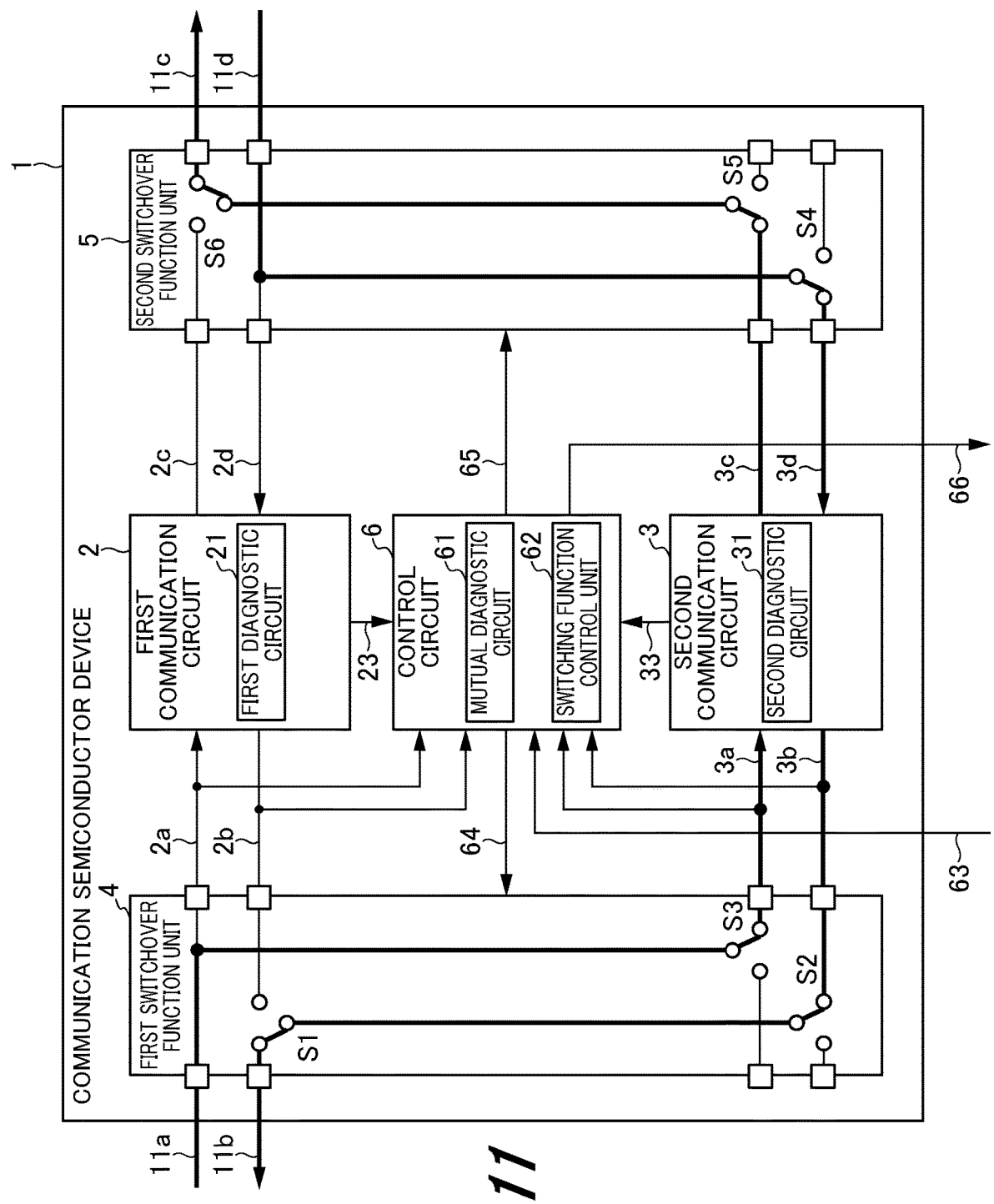
FIG. 11 is a diagram illustrating a communication path when the first communication circuit fails in the redundant mode according to the first embodiment of the present invention.

FIG. 11 illustrates a communication path when the first communication circuit 2 fails in the redundant mode.

When the switch setting is changed to "No. 2", the first switchover function unit 4 inputs and outputs the signals of the communication signal lines 11$a$ and 11$b$ of the first communication system to and from the second communication circuit 3 (sub-communication circuit) as indicated by thick lines in FIG. 11. Similarly, the second switchover function unit 5 inputs and outputs the signals of the communication signal lines 11$c$ and 11$d$ of the first communication system to and from the second communication circuit 3.

FIG. 9 is referred to again for explanation. Then, in step S107, the switching function control unit 62 determines whether or not the communication has ended with the switch setting being "No. 2" and the abnormality notification 66 being "2'b01".

On the other hand, when only the diagnostic result 33 of the second diagnostic circuit 31 is not OK (NO in S104), the switching function control unit 62 proceeds to step S106. In this case, since a failure of any one of the first diagnostic circuit 21, the second diagnostic circuit 31, and the mutual diagnostic circuit 61 is assumed, the switching function control unit 62 stops the communication and outputs "2'b11" as the abnormality notification 66 (S106). Since the communication by the current communication circuit (for example, the first communication circuit 2) is stopped and switching to the sub-communication circuit (for example, the second communication circuit 3) is not performed, the communication by the communication semiconductor device 1 is stopped. After the processing of step S106, the switching function control unit 62 ends the processing of this flowchart.

As described above, the communication semiconductor device according to the first embodiment includes: a first communication circuit that performs a predetermined operation on a signal input and performs a signal output; a second communication circuit that performs a predetermined operation on a signal input and performs a signal output; a first switchover function unit that is connected to one end of the first communication circuit and one end of the second communication circuit and switches an input destination and an output source of a signal with respect to the first communication circuit and the second communication circuit; a second switchover function unit that is connected to the other end of the first communication circuit and the other end of the second communication circuit and switches an input destination and an output source of the signal with respect to the first communication circuit and the second communication circuit; a diagnostic circuit (a first diagnostic circuit, a second diagnostic circuit) that is provided in each of the first communication circuit and the second communication circuit and diagnoses the first communication circuit and the second communication circuit; and a control circuit connected to the first communication circuit and the second communication circuit and the first switchover function unit and the second switchover function unit.

The control circuit includes a switching function control unit that issues an input destination and output source switchover instruction to the first switchover function unit and the second switchover function unit based on a redundant/non-redundant mode switchover signal indicating an operation mode input from an outside and a diagnostic result of each diagnostic circuit.

The communication semiconductor device according to the first embodiment configured as described above includes the first communication circuit and the second communication circuit and the first switchover function unit and the second switchover function unit for switching the signal path, and the first switchover function unit and the second switchover function unit are controlled based on the redundant/non-redundant mode switchover signal and the states of the first communication circuit and the second communication circuit (diagnostic results of the diagnostic circuits). Therefore, the communication semiconductor device according to the present embodiment has a redundant function, and can configure a non-redundant system when the redundant function is not required. As a result, the communication semiconductor device according to the first embodiment can cope with either a case where the communication system is one system or a case where the communication system is two systems.

In the communication semiconductor device according to the present embodiment, an input destination and an output source of each communication circuit (first communication circuit, second communication circuit) can be switched by the first switchover function unit and the second switchover function unit. Therefore, based on the redundant/non-redundant mode switchover signal and the states of the first communication circuit and the second communication circuit (diagnostic results of each diagnostic circuit), a redundant system can be configured for a system requiring a redundant function (redundant mode), and a non-redundant system can be configured for a system not requiring a redundant function (non-redundant mode).

For example, when the communication semiconductor device according to the present embodiment configures a redundant system, the communication semiconductor device can switch to a sub-communication circuit (for example, a first communication circuit) without interrupting the communication when the main communication circuit (for example, a second communication circuit) is abnormal. As a result, the system is not stopped at the time of abnormality, which contributes to functional safety and improvement of reliability.

When the communication semiconductor device according to the present embodiment configures a non-redundant system, each communication circuit can communicate with an independent communication system (first communication system, second communication system). As a result, since hardware can be suppressed, cost can be suppressed.

In addition, in the communication semiconductor device according to the present embodiment, each communication circuit has a self-diagnostic function (first diagnostic circuit, second diagnostic circuit). Therefore, it is possible to diagnose whether or not there is a failure in the communication circuit (for example, a second communication circuit) of the standby system before switching.

In addition, in the communication semiconductor device according to the present embodiment, the control circuit has a mutual diagnostic function (mutual diagnostic circuit) for comparing the inputs/outputs of respective communication circuits. Therefore, it is possible to determine whether or not each diagnostic circuit is normal. Therefore, the communication semiconductor device according to the present embodiment can improve the diagnostic accuracy of each communication circuit.

[SOI Structure and SIP Structure]

Note that, in order to prevent the first communication circuit 2 and the second communication circuit 3 from being simultaneously destroyed, the communication semiconductor device 1 desirably has a silicon on insulator (SOI) structure or a system in a package (SIP) structure as illustrated in FIG. 12.

FIG. 12 is a diagram illustrating an example of an integrated circuit (IC) configuration for avoiding simultaneous destruction of the first communication circuit 2 and the second communication circuit 3 as a configuration of the communication semiconductor device 1.

In the SOI structure, for example, semiconductor elements are separated from each other by using a silicon dioxide ($SiO_2$) film on an SOI substrate (for example, a Si substrate). As illustrated on the left side of FIG. 12, at least a component in which semiconductor elements forming a main communication circuit (for example, the first communication circuit 2) are integrated and a component in which semiconductor elements forming a sub-communication circuit (for example, the second communication circuit 3) are integrated are separated from each other with a $SiO_2$ film interposed therebetween.

For example, as one form of the separation by the $SiO_2$ film in the SOI structure, separation in units of a first component in which semiconductor elements forming the "first communication circuit 2" are integrated, a second component in which semiconductor elements forming the "second communication circuit 3" are integrated, and a third component in which semiconductor elements forming each of the "first switchover function unit 4, the second switchover function unit 5, and the control circuit 6" are integrated is considered. In addition, the third component may be divided more finely by any combination of the "first switchover function unit 4", the "second switchover function unit 5", and the "control circuit 6".

In the SIP structure, for example, a plurality of semiconductor chips are disposed on a lead frame (package member) and sealed in one package. As illustrated on the right side of FIG. 12, at least a semiconductor chip in which semiconductor elements forming a main communication circuit (for example, the first communication circuit 2) are integrated and a semiconductor chip in which semiconductor elements forming a sub-communication circuit (for example, the second communication circuit 3) are integrated are separated from each other.

For example, as one form of the separation by the SIP structure, it is conceivable to seal in the same package a first semiconductor chip in which the "first communication circuit 2" is integrated, a second semiconductor chip in which the "second communication circuit 3" is integrated, and a third semiconductor chip in which the first switchover function unit 4, the second switchover function unit 5, and the control circuit 6 are integrated. In addition, the third semiconductor chip may be further divided into a plurality of semiconductor chips by any combination of the "first switchover function unit 4", the "second switchover function unit 5", and the "control circuit 6".

As described above, by adopting the SOI structure or the SIP structure for the communication semiconductor device 1, it is possible to physically and electrically separate at least the first communication circuit 2 and the second communication circuit 3 from each other to prevent a failure of each communication circuit from reaching another communication circuit. Also in the second to fourth embodiments to be described later, it is desirable to adopt the SOI structure or the SIP structure for the communication semiconductor device.

Second Embodiment

The second embodiment is an example of controlling the first switchover function unit 4 and the second switchover function unit 5 so that the first communication circuit 2 and the second communication circuit 3 operate independently in the non-redundant mode. In addition, the second embodiment is an example of controlling the first switchover function unit 4 and the second switchover function unit 5 so as to continue the communication system on the communication circuit side with a high priority.

The configuration of the communication semiconductor device according to the second embodiment is the same as the configuration of the communication semiconductor device 1 (see FIGS. 1 to 5) according to the first embodiment. However, in the second embodiment, the diagnostic result 616 of the mutual diagnostic circuit 61 included in the control circuit 6 is not used.

[Diagnostic Result of Each Diagnostic Circuit and Control in Switching Function Control Unit]

FIG. 13 is a diagram illustrating an example of a diagnostic result of each diagnostic circuit and control in the switching function control unit 62 in the non-redundant mode.

An illustrated table 72 has items of "No.", "diagnostic result of first diagnostic circuit", "diagnostic result of second diagnostic circuit", and "control in switching function control unit". In FIG. 13, the contents of the control in the switching function control unit 62 are based on the premise that a plurality of communication systems are independently used in the non-redundant mode. In addition, for the priority stored in the memory 62m of the switching function control unit 62, it is assumed that the priority of the first communication circuit 2 is higher than the priority of the second communication circuit 3.

As shown in record No. 1, when the diagnostic result 23 of the first diagnostic circuit 21 is "OK" and the diagnostic result 33 of the second diagnostic circuit 31 is "OK", it can be determined that both the first communication circuit 2 and the second communication circuit 3 are normal. Therefore, the switching function control unit 62 continues communications using the first communication circuit 2 and the second communication circuit 3 independently of each other.

As shown in record No. 2, when the diagnostic result 23 of the first diagnostic circuit 21 is "OK" and the diagnostic result 33 of the second diagnostic circuit 31 is "NG", it can be determined that the second communication circuit 3 has failed. Therefore, the switching function control unit 62 outputs the abnormality notification 66 (2'b10) including the failure information of the second communication circuit 3 to stop the communication by the second communication circuit 3. In addition, the switching function control unit 62 controls the first switchover function unit 4 and the second switchover function unit 5 so that the communication using the first communication circuit 2 with a high priority is continued.

As shown in record No. 3, when the diagnostic result 23 of the first diagnostic circuit 21 is "NG" and the diagnostic result 33 of the second diagnostic circuit 31 is "OK", it can be determined that the first communication circuit 2 has failed. Therefore, the switching function control unit 62 switches to the second communication circuit 3 with a low priority to continue the communication. At this time, the switching function control unit 62 outputs the abnormality notification 66 (2'b01) including the failure information of the first communication circuit 2 to cut off the communication system originally used for communication using the second communication circuit 3.

In addition, although not illustrated in FIG. 13, when the diagnostic result 23 of the first diagnostic circuit 21 is "NG" and the diagnostic result 33 of the second diagnostic circuit 31 is "NG", it can be determined that both the first communication circuit 2 and the second communication circuit 3 have failed.

[Control Processing of Switching Function Control Unit]

Next, a procedure of control processing of the first switchover function unit 4 and the second switchover function unit 5 by the switching function control unit 62 of the control circuit 6 in the non-redundant mode will be described with reference to FIG. 14.

FIG. 14 is a flowchart illustrating an example of control processing of the first switchover function unit 4 and the second switchover function unit 5 by the switching function control unit 62 of the control circuit 6 in the non-redundant mode. Here, an operation when the first communication circuit 2 and the second communication circuit 3 perform communication independently of each other in a case where the operation mode of the communication semiconductor device 1 is set to the non-redundant mode will be described. In addition, a case where the priorities of communication circuits are the same and a case where the priority of the first communication circuit 2 is higher than that of the second communication circuit 3 will be described. Note that, for the contents of the switch setting or the abnormality notification illustrated in FIG. 14, FIGS. 6 and 7 will be referred to.

The redundant mode described in the first embodiment is the communication of one system. However, in the non-redundant mode, communication is performed independently in two systems. Therefore, FIGS. 1 to 7 and 12 referred to in the first embodiment can also be referred to in the present embodiment, but the present embodiment and the second embodiment are different in the following points. The difference is that in the present embodiment, a second communication system (communication signal lines 12a to 12d) is added to the communication semiconductor device 1 in FIG. 1 and the switching function control unit 62 has a function (memory 62m) of storing priority information of each communication circuit.

At the start of communication, the switching function control unit 62 performs switching control of the first switchover function unit 4 and the second switchover function unit 5 as in the switch setting "No. 3" illustrated in FIG. 6, so that the first communication circuit 2 performs communication of the first communication system (communication signal lines 11a to 11d) and the second communication circuit 3 performs communication of the second communication system (communication signal lines 12a to 12d). The switching function control unit 62 outputs "2'b00" as the abnormality notification 66 (S200).

Figure 15:
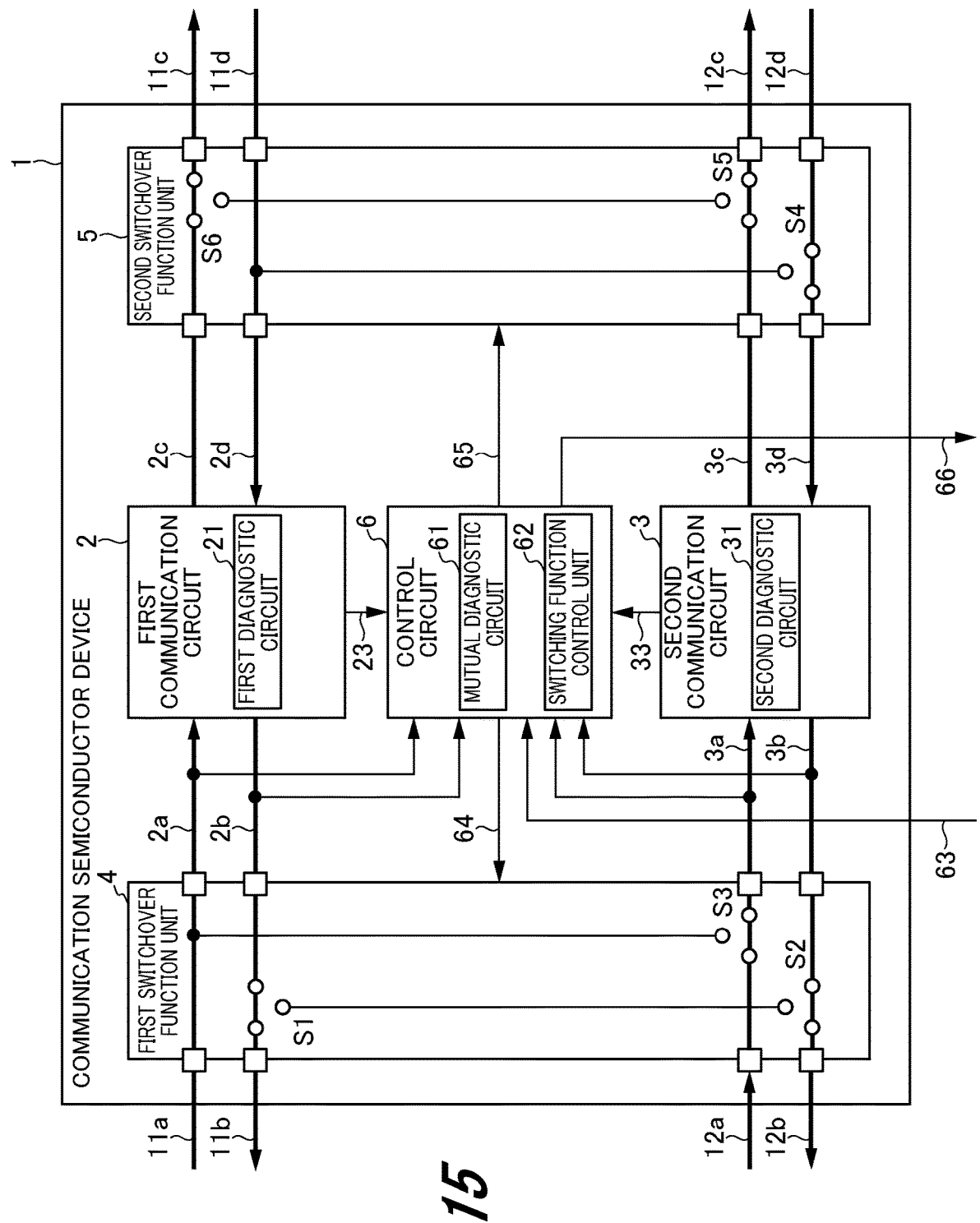
FIG. 15 is a diagram illustrating a communication path when the first communication circuit and the second communication circuit are used in the non-redundant mode according to the second embodiment of the present invention.

Here, FIG. 15 illustrates a communication path when the first communication circuit 2 and the second communication circuit 3 are used in the non-redundant mode.

Since the switch setting is "No. 3", the first switchover function unit 4 inputs and outputs signals of the communication signal lines 11a and 11b of the first communication system to and from the first communication circuit 2 and inputs and outputs signals of the communication signal lines 12a and 12b of the second communication system to and from the second communication circuit 3, as indicated by thick lines in FIG. 15. Similarly, the second switchover function unit 5 inputs and outputs the signals of the communication signal lines 11c and 11d of the first communication system to and from the first communication circuit 2, and inputs and outputs the signals of the communication signal lines 12c and 12d of the second communication system to and from the second communication circuit 3.

FIG. 14 is referred to again for explanation. Then, the switching function control unit 62 determines whether or not the diagnostic result 23 of the first diagnostic circuit 21 and the diagnostic result 33 of the second diagnostic circuit 31 are all OK (S201). When all the diagnostic results 23 and 33 of the diagnostic circuits are OK (YES in S201), it can be determined that the first communication circuit 2 and the second communication circuit 3 are normally operating.

Then, the switching function control unit 62 determines whether or not the communication has ended with the switch setting being "No. 3" and the abnormality notification 66 being "2'b00" (S207). Then, when the communication has not ended (NO in S207), the switching function control unit 62 returns to the determination processing in step S201 to check the diagnostic result of each diagnostic circuit. When the communication has ended (YES in S207), the switching function control unit 62 ends the processing of this flowchart.

On the other hand, when any one of the diagnostic results 23 and 33 of the diagnostic circuits is NG (NO in S201), the switching function control unit 62 proceeds to step S202. Then, the switching function control unit 62 determines whether or not only the diagnostic result 23 of the first diagnostic circuit 21 is OK (S202).

When only the diagnostic result 23 of the first diagnostic circuit 21 is OK (YES in S202), it can be determined that the second communication circuit 3 has failed. Therefore, the switching function control unit 62 outputs "2'b10" as the abnormality notification 66 (S203) while maintaining the switch setting at "No. 3", and stops the communication of the second communication system (communication signal lines 12a to 12d) in response to an instruction from the higher-level computer (for example, the microcomputer 7).

After the processing of step S203, the switching function control unit 62 proceeds to step S207. Then, in step S207, the switching function control unit 62 determines whether or not the communication has ended with the switch setting being "No. 3" and the abnormality notification 66 being "2'b10".

On the other hand, when only the diagnostic result 23 of the first diagnostic circuit 21 is not OK (NO in S202), the switching function control unit 62 proceeds to step S204. Then, the switching function control unit 62 determines whether or not only the diagnostic result 33 of the second diagnostic circuit 31 is OK (S204).

When only the diagnostic result 33 of the second diagnostic circuit 31 is OK (YES in S204), it can be determined that first communication circuit 2 has failed. At this time, when the priorities of the first communication circuit 2 and the second communication circuit 3 stored in the memory 62m are the same, the switching function control unit 62 does not change the switch setting of "No. 3", outputs "2'b01" as the abnormality notification 66, and stops the communication of the first communication system (communication signal lines 11a to 11d) in response to an instruction from the higher-level computer (for example, the microcomputer 7) (S205).

On the other hand, when the priority of the first communication circuit 2 is high, in order to continue the communication of the first communication system, the switching function control unit 62 performs switching control as in the switch setting "No. 2" illustrated in FIG. 6, and outputs "2'b01" as the abnormality notification 66 (S205). At this time, since the signal of the second communication system (communication signal lines 12a to 12d) is not input to or output from any communication circuit by the switching, the switching function control unit 62 stops the communication using the second communication system. Alternatively, the communication of the second communication system may be stopped after receiving an instruction from the higher-level computer (for example, the microcomputer 7).

Figure 16:
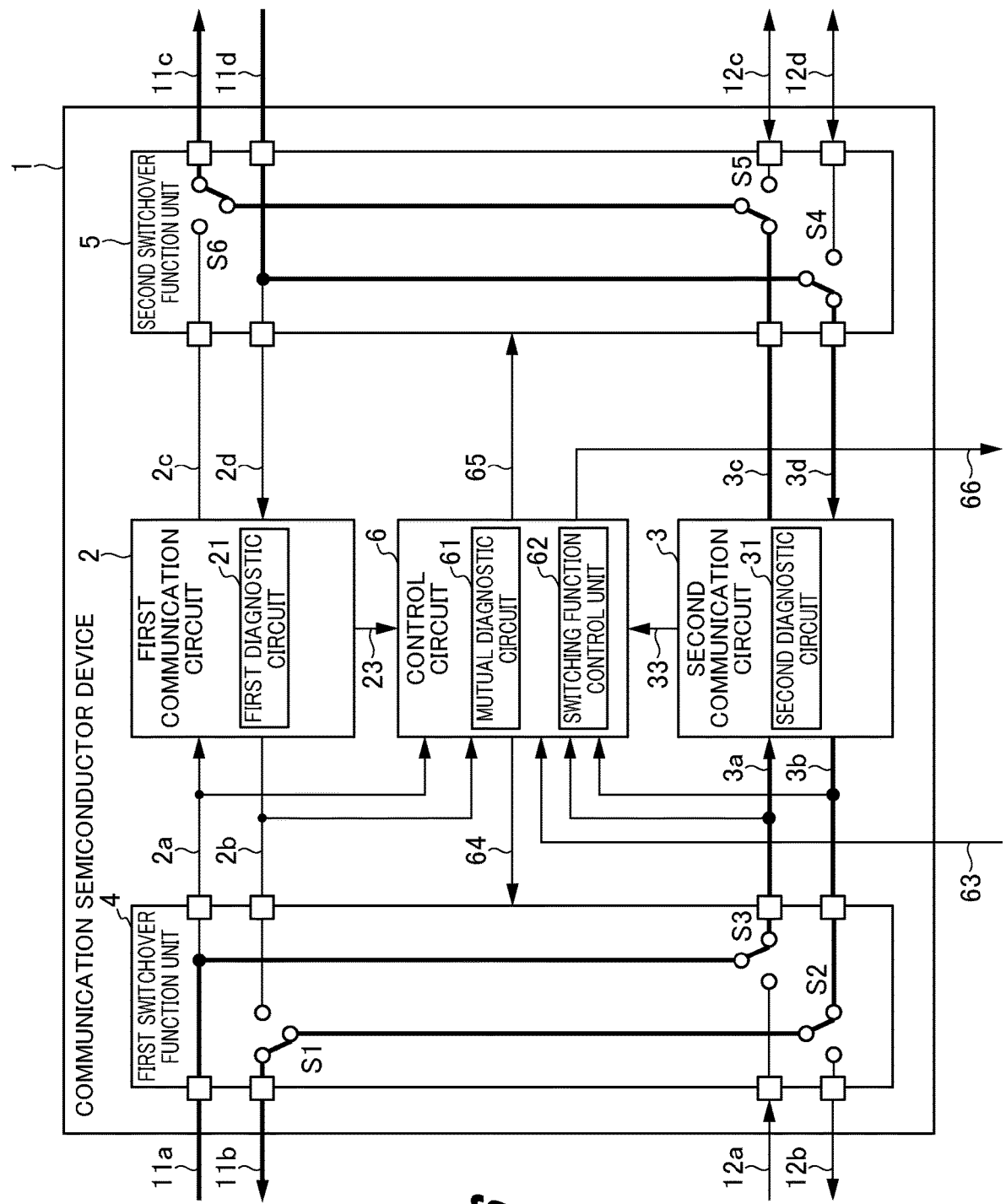
FIG. 16 is a diagram illustrating a communication path when a first communication circuit having a high priority fails in a non-redundant mode according to the second embodiment of the present invention.

FIG. 16 illustrates a communication path when the first communication circuit 2 having a high priority fails in the non-redundant mode.

The switch setting "No. 2" after the switching in response to the failure of the first communication circuit 2 is the same as the switch setting "No. 2" after the switching in the redundant mode (FIG. 11). That is, when the switch setting is changed to "No. 2", the first switchover function unit 4 inputs and outputs the signals of the communication signal lines 11a and 11b of the first communication system to and from the second communication circuit 3 (sub-communication circuit) as indicated by thick lines in FIG. 16. Similarly, the second switchover function unit 5 inputs and outputs the signals of the communication signal lines 11c and 11d of the first communication system to and from the second communication circuit 3. By this switching, the signals of the second communication system are not input to and output from any communication circuit.

FIG. 14 is referred to again for explanation. After the processing of step S205, the switching function control unit 62 proceeds to step S207. Then, in step S207, the switching function control unit 62 determines whether or not the communication has ended with the switch setting being "No. 3" or "No. 2" and the abnormality notification 66 being "2'b01".

On the other hand, when only the diagnostic result 33 of the second diagnostic circuit 31 is not OK (NO in S204), the switching function control unit 62 proceeds to step S206. In this case, since it is assumed that both the first communication circuit 2 and the second communication circuit 3 have failed, the switching function control unit 62 stops the communication of the first communication system and the second communication system and outputs "2'b11" as the abnormality notification 66 (S206). After the processing of step S206, the switching function control unit 62 ends the processing of this flowchart.

As described above, in the communication semiconductor device according to the second embodiment, when the operation mode is a non-redundant mode, the switching function control unit is configured to switch the input paths and the output paths of the first switchover function unit and the second switchover function unit so that different signals are input to the first communication circuit and the second communication circuit and signals corresponding to the above-described different signals are output from the first communication circuit and the second communication circuit.

The communication semiconductor device according to the present embodiment configured as described above can configure a non-redundant system for a system that does not require a redundant function (non-redundant mode) based on the operation mode (redundant/non-redundant mode switchover signal 63). Therefore, in the communication semiconductor device according to the present embodiment, it is possible to independently use the two communication systems (first communication system, second communication system) in the non-redundant mode.

In addition, in the communication semiconductor device according to the second embodiment, information on the priorities of the first communication circuit and the second communication circuit is stored in the switching function control unit (for example, the memory 62m). Then, the switching function control unit is configured to switch the input path and the output path of the first switchover function unit and the second switchover function unit so that communication can be continued using a communication circuit with a low priority when a communication circuit with a high priority between the first communication circuit and the second communication circuit fails.

In the communication semiconductor device according to the present embodiment configured as described above, when a communication circuit (first communication circuit 2) with a high priority fails, it is possible to continue communication without stopping communication using the communication circuit (communication system) with a high priority by switching to the other communication circuit (second communication circuit 3).

In addition, in the communication semiconductor device according to the second embodiment, in a case where the priorities of the first communication circuit and the second communication circuit are the same, when the first communication circuit or the second communication circuit fails, only communication using the first communication circuit or the second communication circuit that has failed is stopped.

In the communication semiconductor device according to the present embodiment configured as described above, since only the communication using the first communication circuit or the second communication circuit that has failed is stopped, it is possible to continue communication using a communication circuit that has not failed.

Third Embodiment

The third embodiment is an example of a case where the communication semiconductor device 1 is used as a CAN I/F that is one of in-vehicle LAN protocols.

[First IC and Second IC are Connected to Different CAN Buses]

FIG. 17 is a diagram illustrating an example of a case where a first IC and a second IC are connected to different CAN buses in a system using a communication semiconductor device 1 according to the third embodiment as a CAN I/F.

The first switchover function unit 4 of the illustrated communication semiconductor device 1 is connected to the microcomputer 7 that is a higher-level computer. The microcomputer 7 and the communication semiconductor device 1 can communicate with each other using a first communication system (communication signal lines 11a to 11b) and a second communication system (communication signal lines 12a to 12b). The microcomputer 7 and the communication semiconductor device 1 are mounted in the same ECU 100. For example, each of the microcomputer 7 and the communication semiconductor device 1 corresponds to an ECU, and the ECU 100 corresponds to an integrated ECU.

The microcomputer 7 is, for example, a computer including a processor such as a CPU, a memory such as a ROM and a RAM, and a communication circuit. The function of the microcomputer 7 described in this specification may be realized by software using a processor interpreting and executing a program for realizing each function. Information such as the program or a table can be stored in a recording medium such as a memory.

In addition, the second switchover function unit 5 of the communication semiconductor device 1 is connected to the first IC 8 through a CAN bus 10A and is connected to the second IC 9 through a CAN bus 10B. The communication semiconductor device 1 and the first IC 8 can communicate with each other using a first communication system (communication signal lines 11c to 11d, CAN bus 10B). In addition, the communication semiconductor device 1 and the second IC 9 can communicate with each other using a first communication system (communication signal lines 11c to 11d, CAN bus 10B). Each of the first IC 8 and the second IC 9 corresponds to an in-vehicle sensor or the like.

The communication semiconductor device 1 according to the present embodiment shown in FIG. 17 has the same configuration and the same operation as the communication semiconductor device 1 according to the second embodiment. The microcomputer 7 communicates with the first IC 8 and the second IC 9 through the communication semiconductor device 1.

For example, when the priorities of the first communication circuit 2 and the second communication circuit 3 are the same in the non-redundant mode, communication between the microcomputer 7 and the first IC 8 is performed using the first communication circuit 2. In addition, communication between the microcomputer 7 and the second IC 9 is performed using the second communication circuit 3. The communication semiconductor device 1 illustrated in FIG. 17 performs the same operation as in a case where the priorities of the communication circuits in the second embodiment are the same.

In addition, in a case where the priority of the first communication circuit 2 is higher than the priority of the second communication circuit 3 in the non-redundant mode, when the first communication circuit 2 fails, the switches S1 to S6 of the first switchover function unit 4 and the second switchover function unit 5 are switched so as not to stop the communication. Then, communication between the microcomputer 7 and the first IC 8 is performed using the second communication circuit 3, and the same operation as in a case where the priority of the first communication circuit 2 is high in the second embodiment is performed.

[First IC and Second IC are Connected to the Same CAN Bus]

Figure 18:
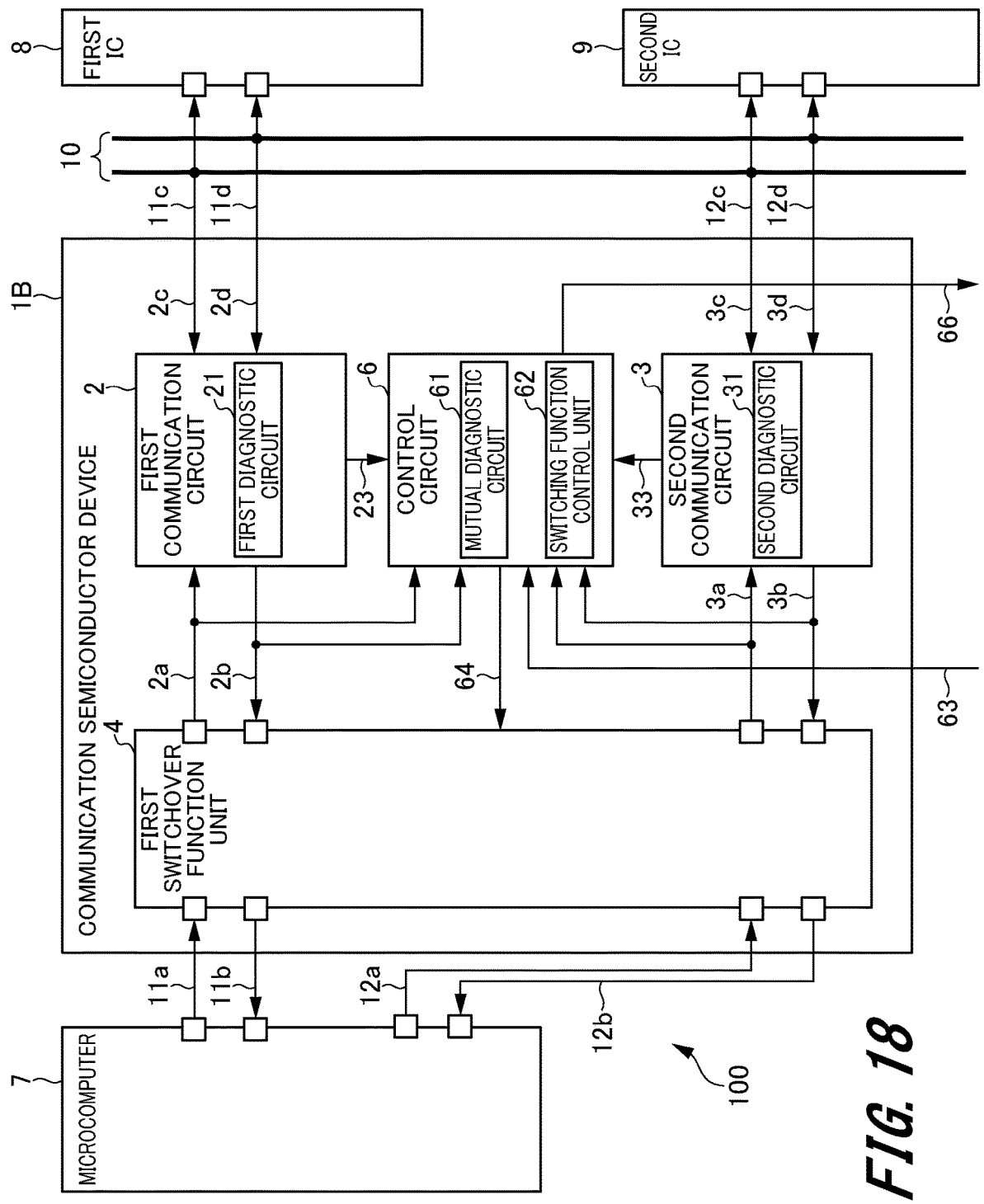
FIG. 18 illustrates an example of a case where a first IC and a second IC are connected to the same CAN bus in a system using the communication semiconductor device according to the third embodiment of the present invention as a CAN I/F.

FIG. 18 is a diagram illustrating an example of a case where a first IC and a second IC are connected to the same CAN bus in a system using a communication semiconductor device 1B according to the third embodiment as a CAN I/F.

The first IC 8 and the second IC 9 are connected to the same CAN bus 10. Since the communication semiconductor device 1B can communicate with the first IC 8 and the second IC 9 by accessing the CAN bus 10 even when the first communication circuit 2 or the second communication circuit 3 fails, the second switchover function unit 5 is omitted in FIG. 18. Other configurations of the communication semiconductor device 1B are the same as those of the communication semiconductor device 1 illustrated in FIG. 1. An operation of the communication semiconductor device 1B in a case where two ICs of the first IC 8 and the second IC 9 illustrated in FIG. 18 are connected to the same CAN bus 10 will be described with reference to FIGS. 19 and 20.

FIG. 19 is a diagram illustrating a configuration example of a switching contents table T2 in which switching contents of the first switchover function unit 4 according to the third embodiment are described.

The switching contents table T2 has items of "type of switchover function unit", "type of switch", and "switch setting (connection switching)". The switching contents of the first switchover function unit 4 described in the switching contents table T2 are the same as the switch settings "No. 1" and "No. 2" of the switches S1 to S3 included in the first switchover function unit 4 described in the switching contents table T1 of FIG. 6.

[Control Processing of Switching Function Control Unit]

Next, a procedure of control processing of the first switchover function unit 4 and the second switchover function unit 5 by the switching function control unit 62 of the control circuit 6 according to the third embodiment will be described with reference to FIG. 20.

Figure 20:
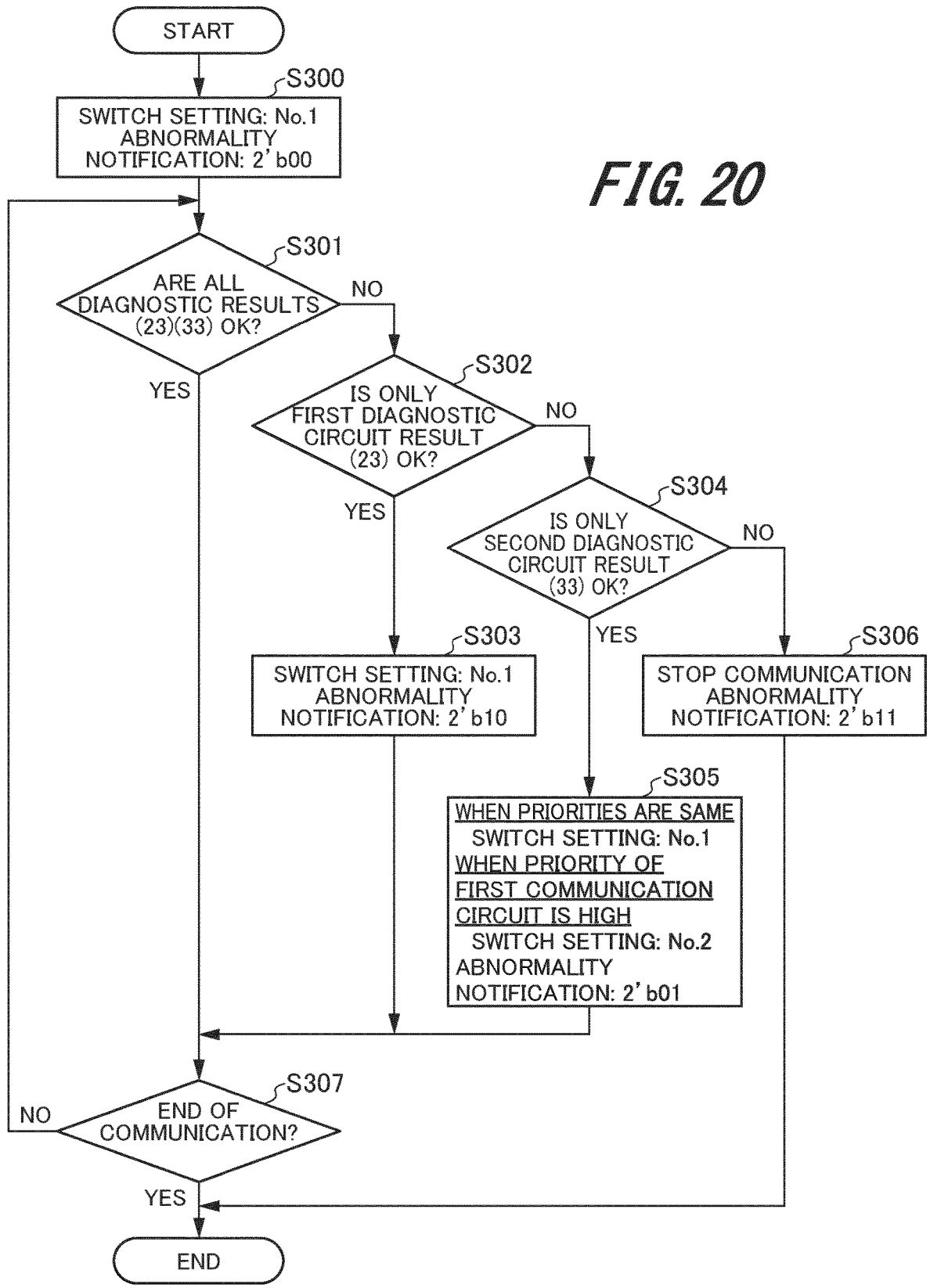
FIG. 20 is a flowchart illustrating an example of control processing of a first switchover function unit by a switching function control unit of a control circuit in the communication semiconductor device illustrated in FIG. 18.

FIG. 20 is a flowchart illustrating an example of control processing of the first switchover function unit 4 by the switching function control unit 62 of the control circuit 6 in the communication semiconductor device 1 illustrated in FIG. 18. For the contents of the switch setting or the abnormality notification illustrated in FIG. 20, FIGS. 19 and 7 will be referred to.

At the start of communication, the switching function control unit 62 performs switching control of the first switchover function unit 4 as in the switch setting "No. 1" illustrated in FIG. 19, so that the first communication circuit 2 performs communication of the first communication system (communication signal lines 11a to 11d) and the second communication circuit 3 performs communication of the second communication system (communication signal lines 12a to 12d). The switching function control unit 62 outputs "2'b00" as the abnormality notification 66 (S300).

Then, the switching function control unit 62 determines whether or not the diagnostic result 23 of the first diagnostic circuit 21 and the diagnostic result 33 of the second diagnostic circuit 31 are all OK (S301). When all the diagnostic results 23 and 33 of the diagnostic circuits are OK (YES in S301), it can be determined that the first communication circuit 2 and the second communication circuit 3 are normally operating.

Then, the switching function control unit 62 determines whether or not the communication has ended with the switch setting being "No. 1" and the abnormality notification 66 being "2'b00" (S307). Then, when the communication has not ended (NO in S307), the switching function control unit 62 returns to the determination processing in step S301 to check the diagnostic result of each diagnostic circuit. When the communication has ended (YES in S307), the switching function control unit 62 ends the processing of this flowchart.

On the other hand, when any one of the diagnostic results 23 and 33 of the diagnostic circuits is NG (NO in S301), the switching function control unit 62 proceeds to step S302. Then, the switching function control unit 62 determines whether or not only the diagnostic result 23 of the first diagnostic circuit 21 is OK (S302).

When only the diagnostic result 23 of the first diagnostic circuit 21 is OK (YES in S302), it can be determined that the second communication circuit 3 has failed. Therefore, the switching function control unit 62 outputs "2'b10" as the abnormality notification 66 (S303) while maintaining the switch setting at "No. 1", and stops the communication of the second communication system (communication signal lines 12a to 12d) in response to an instruction from the higher-level computer (for example, the microcomputer 7).

After the processing of step S303, the switching function control unit 62 proceeds to step S307. Then, in step S307, the switching function control unit 62 determines whether or not the communication has ended with the switch setting being "No. 1" and the abnormality notification 66 being "2'b10".

On the other hand, when only the diagnostic result 23 of the first diagnostic circuit 21 is not OK (NO in S302), the switching function control unit 62 proceeds to step S304. Then, the switching function control unit 62 determines whether or not only the diagnostic result 33 of the second diagnostic circuit 31 is OK (S304).

When only the diagnostic result 33 of the second diagnostic circuit 31 is OK (YES in S304), it can be determined that first communication circuit 2 has failed. At this time, when the priorities of the first communication circuit 2 and the second communication circuit 3 stored in the memory 62m are the same, the switching function control unit 62 does not change the switch setting of "No. 1" and outputs "2'b01" as the abnormality notification 66. Then, the switching function control unit 62 stops the communication of the first communication system (communication signal lines 11a to 11d) in response to an instruction from the higher-level computer (for example, the microcomputer 7) (S305).

On the other hand, when the priority of the first communication circuit 2 is high, in order to continue the communication of the first communication system, the switching function control unit 62 performs switching control as in the switch setting "No. 2" illustrated in FIG. 19, and outputs "2'b01" as the abnormality notification 66 (S305). At this time, since the signal of the second communication system (communication signal lines 12a and 12b) is not input to or output from any communication circuit by the switching (see FIG. 16), the switching function control unit 62 stops the communication using the second communication system. Alternatively, the communication of the second communication system may be stopped after receiving an instruction from the higher-level computer (for example, the microcomputer 7).

After the processing of step S305, the switching function control unit 62 proceeds to step S307. Then, in step S307, the switching function control unit 62 determines whether or not the communication has ended with the switch setting being "No. 1" or "No. 2" and the abnormality notification 66 being "2'b01".

On the other hand, when only the diagnostic result 33 of the second diagnostic circuit 31 is not OK (NO in S304), the switching function control unit 62 proceeds to step S306. In this case, since it is assumed that both the first communication circuit 2 and the second communication circuit 3 have failed, the switching function control unit 62 stops the communication of the first communication system and the second communication system and outputs "2'b11" as the abnormality notification 66 (S306). After the processing of step S306, the switching function control unit 62 ends the processing of this flowchart.

As described above, since the communication semiconductor devices 1 and 1B according to the third embodiment can be used as the CAN I/F, the communication semiconductor devices 1 and 1B can also be applied to a vehicle. In addition, in the communication semiconductor devices 1 and 1B, when an abnormality occurs in the main communication circuit (for example, the first communication circuit 2), switching to the sub-communication circuit (for example, the second communication circuit 3) can be performed without interrupting the communication. Therefore, it is possible to contribute to functional safety and improvement of reliability even in the in-vehicle field. For example, since the communication semiconductor devices 1 and 1B mounted in the ECU 100 corresponding to the integrated ECU have a redundant function, it is possible to support the functional safety of the ECU 100 and improve reliability.

Fourth Embodiment

Next, as a means for avoiding electrical breakdown, explosion, and combustion that can lead to common cause failures, an example will be described in which a cutoff request for the upstream power supply circuit is made according to the states of the first communication circuit 2 and the second communication circuit 3 of the communication semiconductor device. Note that, for a method of determining the states of the first communication circuit 2 and the second communication circuit 3, the first to third embodiments will be referred to.

Figure 21:
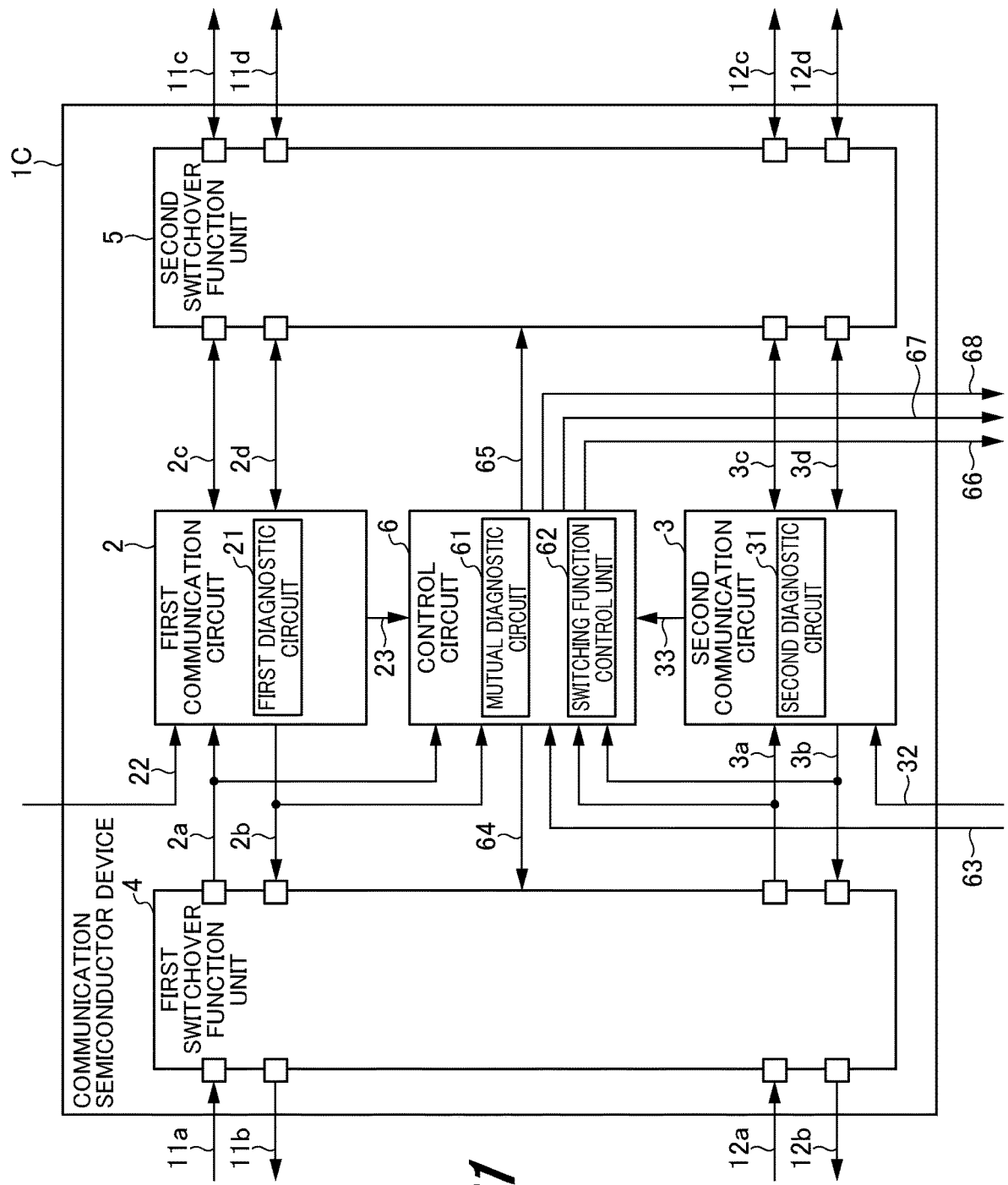
FIG. 21 is a block diagram illustrating a configuration example of a communication semiconductor device according to a fourth embodiment of the present invention.

FIG. 21 is a block diagram illustrating a configuration example of a communication semiconductor device 1C according to a fourth embodiment.

The basic configuration of the communication semiconductor device 1C according to the present embodiment is the same as the configuration of the communication semiconductor device 1 (FIG. 1) according to the first embodiment. However, in the communication semiconductor device 1C, a first power supply 22 of the first communication circuit 2, a second power supply 32 of the second communication circuit 3, a cutoff request 67 (first power cutoff request) for the first power supply 22, and a cutoff request 68 (second power cutoff request) for the second power supply 32 are added to the communication semiconductor device 1 in FIG. 1. Details thereof will be described with reference to FIG. 22.

FIG. 22 is a diagram illustrating an example of a request for cutting off a higher-level power supply circuit (not illustrated).

In the present embodiment, the cutoff requests 67 and 68 are 1-bit signals, and "1'b0" illustrated in FIG. 22 means that the cutoff request is invalid and "1'b1" means that the cutoff request is valid. The communication semiconductor device 1C makes a power cutoff request, in parallel with the switching control of the first switchover function unit 4 and the second switchover function unit 5, based on the state of each communication circuit.

When both the first communication circuit 2 and the second communication circuit 3 are normal, "1'b0" is output as the cutoff request 67 for the first power supply 22 and the cutoff request 68 for the second power supply 32, so that none of both the communication circuits cut off the power supplies.

When only the first communication circuit 2 fails, only the cutoff request 67 of the first power supply 22 "1'b1" is output, and the upstream power supply circuit that has received the cutoff request 67 of the first power supply 22 cuts off the first power supply 22.

When only the second communication circuit 3 fails, "1'b1" is output as only the cutoff request 68 for the second power supply 32, and the upstream power supply circuit that has received the cutoff request 68 for the second power supply 32 cuts off the second power supply 32.

When both the first communication circuit 2 and the second communication circuit 3 fail, "1'b1" is output as the cutoff request 67 for the first power supply 22 and the cutoff request 68 for the second power supply 32. Then, the upstream power supply circuit that has received the cutoff request 67 for the first power supply 22 and the cutoff request 68 for the second power supply 32 cuts off the first power supply 22 and the second power supply 32. For other configurations and operations of the communication semiconductor device 1C, the first to third embodiments will be referred to.

As described above, in the communication semiconductor device according to the fourth embodiment, the switching function control unit is configured to make a cutoff request to the power supply circuit that supplies power to the communication semiconductor device when a failure is detected in each of the diagnostic circuits (first diagnostic circuit 21, second diagnostic circuit 31) of the first communication circuit and the second communication circuit.

The communication semiconductor device according to the fourth embodiment configured as described above can avoid a common cause failure by making a cutoff request to the power supply circuit to cut off the power when each communication circuit fails. By cutting off the power when any component included in the communication semiconductor device fails, it is possible to avoid a common cause failure which is a problem when a function having a redundant configuration by two communication circuits is integrated into an integrated circuit.

Note that the present invention is not limited to the first to fourth embodiments described above, and it goes without saying that various other application examples and modification examples can be taken without departing from the gist of the present invention described in the claims.

although the configuration of the communication semiconductor device has been described in detail and specifically in the above embodiments in order to describe the present invention in an easy-to-understand manner, all the components described above are not necessarily included. In addition, a part of the configuration of one embodiment can be replaced with a component of another embodiment. In addition, components of other embodiments can be added to the configuration of one embodiment. In addition, it is also possible to add, replace, or delete other components for a part of the configuration of each embodiment.

In addition, some or all of the above-described configurations, functions, processing units, and the like may be realized by hardware, for example, by designing with an integrated circuit. A processor device in a broad sense such as a field programmable gate array (FPGA) or an application specific integrated circuit (ASIC) may be used as the hardware.

In addition, in the flowcharts describing the time-series processing illustrated in FIGS. 9, 14, and 20, a plurality of processes may be performed in parallel or the processing order may be changed within a range not affecting the processing result.

In addition, in the above-described embodiments, control lines and information lines considered to be necessary for description are illustrated, and not all control lines and information lines are necessarily illustrated in terms of products. In practice, almost all the components may be considered to be connected to each other.

REFERENCE SIGNS LIST 1, 1B, 1C communication semiconductor device
11a to 11d communication signal line (first communication system)
12a to 12d communication signal line (second communication system)
2 first communication circuit
2a to 2d communication signal line
21 first diagnostic circuit
23 diagnostic result of first diagnostic circuit
24 transmitter
25 receiver
211 diagnostic receiver
212, 213 comparator
214 OR circuit
215 output of diagnostic receiver
2a to 2d communication signal line of first communication circuit
3 second communication circuit
31 second diagnostic circuit
33 diagnostic result of second diagnostic circuit
3a to 3d communication signal line of second communication circuit
4 first switchover function unit
5 second switchover function unit
6 control circuit
61 mutual diagnostic circuit
62 switching function control unit
62m memory
63 redundant/non-redundant mode switchover signal
64 control signal of first switchover function unit
65 control signal of second switchover function unit
66 abnormality notification
67 first power cutoff request
68 second power cutoff request
611, 612 comparator
613 OR circuit
614 output of comparator
615 output of comparator
616 output of mutual diagnostic circuit
7 microcomputer
8 first IC
9 second IC
100 ECU
S1 first switch
S2 second switch
S3 third switch
S4 fourth switch
S5 fifth switch
S6 sixth switch
T1, T2 switching contents table

The invention claimed is:

1. A communication semiconductor device, comprising:
a first communication circuit that performs a predetermined operation on a signal input and performs a signal output;
a second communication circuit that performs a predetermined operation on a second signal input and performs a signal output;
a first switchover function unit that is connected to one end of the first communication circuit and one end of the second communication circuit and switches an input destination and an output source of a signal with respect to the first communication circuit and the second communication circuit;
a second switchover function unit that is connected to another end of the first communication circuit and the another end of the second communication circuit and switches an input destination and an output source of the signal with respect to the first communication circuit and the second communication circuit;
a diagnostic circuit that is provided in each of the first communication circuit and the second communication circuit and diagnoses the first communication circuit and the second communication circuit; and a control circuit connected to the first communication circuit and the second communication circuit and the first switchover function unit and the second switchover function unit, wherein the control circuit includes:

a switching function control unit that issues an input destination and output source switchover instruction to the first switchover function unit and the second switchover function unit based on a redundant/non-redundant mode switchover signal indicating an operation mode input and a diagnostic result of each diagnostic circuit, wherein the control circuit includes:

a mutual diagnostic circuit that compares the first communication circuit and the second communication circuit with each other based on input information and output information of the first communication circuit and the second communication circuit and outputs a comparison result to the switching function control unit when the operation mode is a redundant mode.

2. The communication semiconductor device according to claim 1, wherein the mutual diagnostic circuit mutually diagnoses the first communication circuit and the second communication circuit by comparing information input to the transmitter of the first communication circuit with information output from the receiver of the second communication circuit and comparing information input to the transmitter of the second communication circuit with information output from the receiver of the first communication circuit.

3. The communication semiconductor device according to claim 2, wherein the switching function control unit switches an input path and an output path of a signal in the first switchover function unit and the second switchover function unit based on a diagnostic result of the mutual diagnostic circuit and a diagnostic result of each diagnostic circuit included in the first communication circuit and the second communication circuit.

4. The communication semiconductor device according to claim 3, wherein, when the operation mode is a non-redundant mode, the switching function control unit switches input paths and output paths of the first switchover function unit and the second switchover function unit so that different signals are input to the first communication circuit and the second communication circuit and each of signals corresponding to the different signals are output from the first communication circuit and the second communication circuit.

5. The communication semiconductor device according to claim 4, wherein information on priorities of the first communication circuit and the second communication circuit is stored in the switching function control unit, and the switching function control unit switches the input paths and the output paths of the first switchover function unit and the second switchover function unit so that communication can be continued using a communication circuit with a low priority when a communication circuit with a high priority between the first communication circuit and the second communication circuit fails.

6. The communication semiconductor device according to claim 5, wherein, in a case where the priorities of the first communication circuit and the second communication circuit are the same, when the first communication circuit or the second communication circuit fails, only communication using the first communication circuit or the second communication circuit that has failed is stopped.

7. The communication semiconductor device according to claim 1, wherein, when an abnormality of any of the first communication circuit and the second communication circuit, each of the diagnostic circuits of the first communication circuit and the second communication circuit, and the mutual diagnostic circuit is detected, the switching function control unit notifies a communication partner of the communication semiconductor device of the abnormality.

8. The communication semiconductor device according to claim 7, wherein, when a failure is detected in each of the diagnostic circuits of the first communication circuit and the second communication circuit, the switching function control unit makes a cutoff request to a power supply circuit that supplies power to the communication semiconductor device.

9. The communication semiconductor device according to claim 7, wherein a first component in which semiconductor elements forming the first communication circuit are integrated, a second component in which semiconductor elements forming the second communication circuit are integrated, and a third component in which semiconductor elements forming each of the first switchover function unit, the second switchover function unit, and the control circuit are integrated are separated from each other with a silicon dioxide interposed therebetween on an silicon on insulator (SOI) substrate.

10. The communication semiconductor device according to claim 7, wherein a system in a package (SIP) structure is adopted in which a first semiconductor chip in which the first communication circuit is integrated, a second semiconductor chip in which the second communication circuit is integrated, and a third semiconductor chip in which the first switchover function unit, the second switchover function unit, and the control circuit are integrated are sealed in the same package.

11. A communication semiconductor device, comprising:

a first communication circuit that performs a predetermined operation on a signal input and performs a signal output;

a second communication circuit that performs a predetermined operation on a second signal input and performs a signal output;

a first switchover function unit that is connected to one end of the first communication circuit and one end of the second communication circuit and switches an input destination and an output source of a signal with respect to the first communication circuit and the second communication circuit;

a second switchover function unit that is connected to another end of the first communication circuit and the another end of the second communication circuit and switches an input destination and an output source of the signal with respect to the first communication circuit and the second communication circuit;

a diagnostic circuit that is provided in each of the first communication circuit and the second communication circuit and diagnoses the first communication circuit and the second communication circuit; and a control circuit connected to the first communication circuit and the second communication circuit and the first switchover function unit and the second switchover function unit, wherein the control circuit includes:

a switching function control unit that issues an input destination and output source switchover instruction to the first switchover function unit and the second switchover function unit based on a redundant/non-redundant mode switchover signal indicating an operation mode input and a diagnostic result of each diagnostic circuit, wherein, when the operation mode is a redundant mode, signals input to the first communication circuit and the second communication circuit are the same signal, wherein each of the first communication circuit and the second communication circuit includes a transmitter and a receiver, and each diagnostic circuit of the first communication circuit and the second communication circuit diagnoses each of the first communication circuit and the second communication circuit by comparing information input to the transmitter with information output from the receiver.

* * * * *